United States Patent
Song

(10) Patent No.: US 11,767,436 B2
(45) Date of Patent: Sep. 26, 2023

(54) THERMAL AND COLD SPRAY PLASTIC COATING COVERING VEHICLE FASTENERS INSIDE FUEL TANK FOR LIGHTNING STRIKE AND OTHER ELECTROMAGNETIC PROTECTION

(71) Applicant: THE BOEING COMPANY, Chicago, IL (US)

(72) Inventor: Weidong Song, Mukilteo, WA (US)

(73) Assignee: THE BOEING COMPANY, Arlington, VA (US)

( * ) Notice: Subject to any disclaimer, the term of this patent is extended or adjusted under 35 U.S.C. 154(b) by 266 days.

(21) Appl. No.: 16/052,015

(22) Filed: Aug. 1, 2018

(65) Prior Publication Data

US 2020/0040201 A1 Feb. 6, 2020

(51) Int. Cl.
*C09D 5/24* (2006.01)
*C09D 161/16* (2006.01)
(Continued)

(52) U.S. Cl.
CPC ............. *C09D 5/24* (2013.01); *C09D 161/16* (2013.01); *C23C 4/02* (2013.01); *C23C 4/04* (2013.01);
(Continued)

(58) Field of Classification Search
CPC ..... C23C 4/02; C23C 4/04; F16B 1/00; F16B 2001/0064; F16B 37/14; F16B 33/06; F16B 33/004; F16B 33/008; B60K 15/03; B60K 2015/03401; B64D 45/02; B64D 37/32; Y02T 50/40; B64F 5/10; B05B 7/205; B05B 13/0431; B05B 12/00; B05D 1/12; B05D 5/12; C09D 5/24; C09D 161/16; C09D 7/61; C09D 5/03; C08K 2201/001; C08K 2003/085; C08K 2003/0862;
(Continued)

(56) References Cited

U.S. PATENT DOCUMENTS 3,755,713 A 8/1973 Paszkowski
5,302,414 A 4/1994 Alkhimov et al.
(Continued)

FOREIGN PATENT DOCUMENTS

CN 1410475 A 4/2003
CN 101115791 A 1/2008
(Continued)

OTHER PUBLICATIONS

Polymer Database, "Polyphenylene Sulfide (PPS)", retrieved from the internet: https://polymerdatabase.com/Commercial Polymers/PPS.html [retrieved on Mar. 23, 2023], pp. 1-2.
(Continued)

*Primary Examiner* — Nathan L Van Sell
(74) *Attorney, Agent, or Firm* — COATS & BENNETT, PLLC

(57) ABSTRACT

Tunable thermoplastic polymer powder feedstock formulations and tunable conductive thermoplastic polymer powder feedstock formulations are disclosed for delivery to a high-velocity sprayer, along with tunable coatings made from the disclosed formulations and methods for coating installed fasteners, and fasteners, fastener/substrate interfaces and substrates coated with the tunable thermoplastic polymer coatings.

21 Claims, 16 Drawing Sheets

(51) Int. Cl.
 *C23C 4/02* (2006.01)
 *C23C 4/04* (2006.01)
 *F16B 1/00* (2006.01)
 *B60K 15/03* (2006.01)
 *B64D 45/02* (2006.01)
 *C08K 3/08* (2006.01)

(52) U.S. Cl.
 CPC ............... *F16B 1/00* (2013.01); *B60K 15/03* (2013.01); *B60K 2015/03401* (2013.01); *B64D 45/02* (2013.01); *C08K 3/08* (2013.01); *C08K 2003/0881* (2013.01); *F16B 2001/0064* (2013.01)

(58) Field of Classification Search
 CPC .......... C08K 3/041; C08K 3/042; C08K 3/04; C09K 3/1006; C09K 2200/0657; C09K 2200/0667; C09K 2200/0682; C08L 2205/025
 See application file for complete search history.

(56) References Cited

U.S. PATENT DOCUMENTS

| | | | |
|---|---|---|---|
| 8,293,378 B2 | 10/2012 | Owen et al. | |
| 8,658,256 B2 | 2/2014 | Shokri et al. | |
| 11,390,773 B2 | 7/2022 | Song | |
| 2002/0168466 A1 | 11/2002 | Tapphorn et al. | |
| 2005/0196543 A1 | 9/2005 | Morton | |
| 2006/0183841 A1 | 8/2006 | Aneja et al. | |
| 2007/0044406 A1 | 3/2007 | Van Aken et al. | |
| 2008/0011444 A1 | 1/2008 | Clark et al. | |
| 2010/0063072 A1 | 3/2010 | Palle et al. | |
| 2010/0224724 A1 | 9/2010 | Kamino et al. | |
| 2012/0138609 A1 | 6/2012 | Gerken et al. | |
| 2014/0055906 A1* | 2/2014 | Whitlock ............... | B64D 45/02 361/218 |
| 2015/0210039 A1* | 7/2015 | Simmons ............... | B82Y 30/00 428/172 |
| 2015/0271960 A1* | 9/2015 | Yoon ....................... | B32B 37/12 156/244.11 |
| 2016/0096302 A1 | 4/2016 | Drexler et al. | |
| 2016/0107739 A1* | 4/2016 | Restuccia ............ | B29C 70/025 428/114 |
| 2017/0152601 A1 | 6/2017 | Cavaille et al. | |
| 2017/0217560 A1 | 8/2017 | Gideon et al. | |
| 2017/0275476 A1 | 9/2017 | Sarkis et al. | |
| 2018/0298154 A1* | 10/2018 | Lundorf .................. | C01B 32/05 |

FOREIGN PATENT DOCUMENTS

| | | | | |
|---|---|---|---|---|
| CN | 101309758 A | 11/2008 | | |
| CN | 103194142 A | 7/2013 | | |
| CN | 107674559 A | 2/2018 | | |
| EP | 0988898 A2 | 3/2000 | | |
| EP | 2733231 A1 | 5/2014 | | |
| EP | 2585372 B1 | 4/2016 | | |
| EP | 3150502 A1 | 4/2017 | | |
| WO | 2006076341 A2 | 7/2006 | | |
| WO | 2008048705 A2 | 4/2008 | | |
| WO | 2015023353 A1 | 2/2015 | | |
| WO | WO-2015119123 A1 * | 8/2015 | ............... | C08J 5/00 |
| WO | WO-2016078664 A1 * | 5/2016 | ............... | C08K 9/04 |
| WO | 2018110488 A1 | 6/2018 | | |

OTHER PUBLICATIONS

Polymer Database, "Nylon 12—Poly(ω-dodecanamide)", retrieved from the internet: https://blog.polymerdatabase.com/polymers/nylon12.html [retrieved on Mar. 23, 2023], pp. 1-2.

Polymer Database, "Nylon 11—Poly(ω-undecanamide)", retrieved from the internet: https://blog.polymerdatabse.com/polymers/nylon11.html [retrieved on Mar. 23, 2023], pp. 1-2.

Polymer Database, "Unfilled Polyetheretherketone (PEEK)", retrieved from the internet: https://polymerdatabase.com/Commercial Polymers/PEEK.html [retrieved on Mar. 23, 2023], pp. 1-2.

Polymer Database, "Nylon 6-6—Poly(hexamethylene adipamide)", retrieved from the internet: https://blog.polymerdatabase.com/polymers/nylon66.html [retrieved on Mar. 23, 2023], pp. 1-2.

Polymer Database, "Nylon 6—Poly(caprolactam)", retrieved from the internet: https://blog.polymerdatabase.com/polymers/nylon6.html [retrieved on Mar. 23, 2023], pp. 1-2.

\* cited by examiner

THERMAL AND COLD SPRAY PLASTIC COATING COVERING VEHICLE FASTENERS INSIDE FUEL TANK FOR LIGHTNING STRIKE AND OTHER ELECTROMAGNETIC PROTECTION

TECHNOLOGICAL FIELD

The present disclosure relates generally to the field of coatings and sealants. More specifically the present disclosure relates to the field of coatings and sealants, including conductive coatings and sealants, particularly those coatings and sealants applied to a surface by thermal spraying.

BACKGROUND

In many fields, components on large structures, including those found on vehicles, including aircraft, etc., are typically coated with paints, primers, coatings, etc. that can provide a number of important functions to a substrate surface, including, for example, protection from corrosion and other forms of environmental degradation, overcoat or sealant adhesion, abrasion resistance, appearance, etc. Coating and sealants are often applied to areas of assembled components or sub-assemblies that are difficult to access through traditional coating and sealant application processes. In addition, a significant number, sometimes numbering in the thousands and tens of thousands, of small parts requiring coatings and/or sealants (e.g., fasteners, etc.) can occur in assemblies in a large structure (e.g., fuel tanks on aircraft, etc.). Such coatings and sealants require lengthy curing protocols of several days or more, or require applying heat or other added triggering mechanism (e.g. ultraviolet radiation, etc.) to obtain an appropriate degree of curing.

Further, some coatings (e.g. paints and primers, etc.) and sealants are often electrically insulative and can result in an impediment to the dissipation of static and other electrical charges. However, certain structures require the need to dissipate electrical charges that build up on a structure's interior and/or exterior surfaces, including static electrical charges, and charges resulting from, for example lightning strikes, etc. The need for electrical charge dissipation is increasingly important in the aircraft industry, as aircraft manufacture continues to incorporate non-metallic materials. Further, in certain aircraft assemblies, non-metallic materials, such as composites, plastics, etc., that do not dissipate electrical charges predictably across their surfaces may be joined with, or otherwise contact, assemblies and sub-assemblies that comprise metallic materials that do conduct electrical charges. That is, components, assemblies and sub-assemblies that include both composite and metallic materials may be used in the manufacture of, or otherwise incorporated into, larger structures (e.g. aircraft).

Such structures may encounter electromagnetic effects (EMEs) including, for example, and without limitation, lightning strikes. When a structure encounters an EME, the charge delivered to the structure travels throughout any conductive path, and can cause damage to exposed dielectric materials including, for example, composite materials. The electrical damage to composite materials from EMEs can be exacerbated if the edges of the composite material comprise exposed carbon fibers. If the path of charges resulting from an EME encounters varying materials having varying conductivities, damage at or near the material interface can occur. Such interfaces include, without limitation, fasteners/substrate interfaces; and can further include joint interfaces where, for example, seals occur.

Carbon fiber reinforced plastic materials (CFRPs) have utility in structures including, without limitation, vehicles including, without limitation, aircraft. CFRPs comprise a fiber material (e.g. carbon fibers, etc.) impregnated with a resin material (e.g. epoxy resin, acrylic resin, etc.) to make so-called prepregs. Prepregs are partially cured layers that can be manufactured into rolls that can yield unrolled sheets for use in composite material manufacture. Prepreg material, or "prepregs" can then be "laid-up" or "stacked" into multi-layered "stacks" that can be shaped on forming mandrels or other tooling, followed by curing or partially curing the shaped material to produce a composite material that, if desired, adopts desired and predetermined shapes and dimensions imparted by the tool, with the composite material having desired weight and strength. Alternately, prepregs may be oriented into a stack that is trimmed and cured to form a solid stack for use as a composite material structure or other type of composite component.

In aircraft manufacture, CFRP parts are often joined to metallic parts. Problems can occur with respect to predictably dissipating electrical charges when materials, such as CFRPs and various metals (e.g. aluminum, titanium, etc.) that have differing conductivities are joined, fastened, or are otherwise in close proximity to one another.

Coatings, especially coatings used in aircraft manufacture, also must be robust enough to possess a plurality of characteristics, but may not adequately provide all of the required functions to an equivalent or acceptable degree. For example, conductive coatings for dissipating electrical charges across metallic and non-metallic coatings alike have been tried with varying success. However, the known conductive coatings must be loaded with conductive particles to such an extent (sometimes as much as 50-70 weight percent), that other required coating characteristics suffer.

In addition, surface coatings that may be designed to alleviate electrical imbalances across various metallic and/or non-metallic surfaces must often, at least in part, address additional concerns and functions including appearance, adhesion, abrasion resistance, environmental degradation, etc.

Further, inherent coating characteristics (viscosity, etc.,) may make it difficult to apply such coatings to parts (e.g., including without limitation, fasteners located in or on restrictive locations and surfaces) using efficient application techniques. For example, an otherwise desirable coating may be too viscous to apply to a surface using sprayers, when an application mode such as spraying could otherwise offer improvements to coating processing in terms of, efficiency, cost savings, etc.

In addition, specialized coatings having a useful range of varying properties may be expensive to prepare, maintain, store, or deploy. Otherwise useful coatings may further have long curing times, for example taking days to cure with or without the presence of elevated curing temperatures or the use of additional triggering processes. Such extended or complex curing regimens further add to the manufacturing time required, as well as increasing cost. In addition, specialized coatings may lack an adequate shelf life or pot life to be useful for very long on-site. It may further be economically impractical for a particular manufacturing facility (in terms of equipment or space requirements) to store and/or inventory coatings that require, for example, maintenance at particular temperatures.

SUMMARY

A present aspect discloses an assembly including a first substrate and a second substrate, a fastener configured to join the first substrate and the second substrate, and a spray-deposited thermoplastic polymer coating configured to coat the fastener. The spray-deposited thermoplastic polymer coating includes at least one thermoplastic polymer comprising at least one of: nylon, polyetheretherketone, polyetherketoneketone, polyamide, polyphenylsulfide, polyphenylsulfone, polysulfone, and polyetheramide. The spray-deposited thermoplastic polymer coating further includes at least one thermoplastic polymer comprising at least one of: copolymers including Hytrel® TPC-ET (DuPont®), thermoplastic elastomers, and thermoplastic fluoroelastomers including DAI-EL® T-530 (Daikin®).

In another aspect, the assembly includes a thermoplastic polymer coating that further includes a conductive material comprising at least one of: titanium, nickel alloy, copper, carbon black, graphene powder, and carbon nanotubes.

Another present aspect discloses a fastener coating system including a high-velocity sprayer and at least one thermoplastic polymer powder as a feedstock, with the thermoplastic polymer powder including at least one of: nylon, polyetheretherketone, polyetherketoneketone, polyamide, polyphenylsulfide, polyphenylsulfone, polysulfone, and polyetheramide. The spray-deposited thermoplastic polymer coating further includes at least one thermoplastic polymer comprising at least one of: copolymers including Hytrel® TPC-ET (DuPont®), thermoplastic elastomers, and thermoplastic fluoroelastomers including DAI-EL® T-530 (Daikin®).

In another aspect, the thermoplastic polymer powder further includes a conductive material powder including at least one of: titanium, nickel alloy, copper, carbon black, graphene powder, or carbon nanotubes.

In another aspect, the feedstock includes a feedstock mixture of at least one thermoplastic polymer powder feedstock.

In a further aspect, the feedstock mixture includes a mixture of at least one thermoplastic polymer powder feedstock combined with a conductive powder feedstock material.

Still further aspects are directed to fasteners including the disclosed thermoplastic polymer coatings and the disclosed conductive thermoplastic polymer coatings, as well as assemblies that include the coated fasteners, and larger objects that include the assemblies that further include the coated fasteners.

Another aspect is directed to a method for coating an installed fastener including delivering a thermoplastic polymer powder feedstock to a high-velocity sprayer, with the thermoplastic polymer powder feedstock comprising at least one of: nylon, polyetheretherketone, polyetherketoneketone, polyamide, polyphenylsulfide, polyphenylsulfone, polysulfone, and polyetheramide. Further thermoplastic polymer powder feedstocks include at least one thermoplastic polymer powder comprising at least one of: copolymers including Hytrel® TPC-ET (DuPont®), thermoplastic elastomers, and thermoplastic fluoroelastomers including DAI-EL® T-530 (Daikin®). A thermoplastic polymer coating material is formed, followed by directing the thermoplastic polymer coating material from the high-velocity sprayer to the installed fastener and depositing an amount of the thermoplastic polymer coating material on the installed fastener, and coating the installed fastener with the thermoplastic polymer coating material.

Another aspect is directed to a method for coating an installed fastener including delivering a thermoplastic polymer powder feedstock to a high-velocity sprayer, with the thermoplastic polymer powder feedstock comprising at least one of: nylon, polyetheretherketone, polyetherketoneketone, polyamide, polyphenylsulfide, polyphenylsulfone, polysulfone, and polyetheramide; and a conductive powder feedstock comprising at least one of: titanium, nickel alloy, copper, carbon black, graphene powder, or carbon nanotubes. Further thermoplastic polymer powder feedstocks further include at least one thermoplastic polymer powder comprising at least one of: copolymers including Hytrel® TPC-ET (DuPont®), thermoplastic elastomers, and thermoplastic fluoroelastomers including DAI-EL® T-530 (Daikin®). A conductive thermoplastic polymer coating material is formed, followed by directing the conductive thermoplastic polymer coating material from the sprayer to the installed fastener and depositing an amount of the conductive thermoplastic polymer coating material on the installed fastener, and coating the installed fastener with the conductive thermoplastic polymer coating material.

In another aspect, the high-velocity sprayer is a thermal sprayer or a cool sprayer.

Another aspect is directed to a method for coating an installed fastener further including directing the movement of the high-velocity sprayer by associating a robot in communication with the high-velocity sprayer and a controller for controlling and regulating the amount of thermoplastic polymer coating material or conductive thermoplastic polymer coating material deposited onto a fastener installed in a substrate.

In further aspects, one or more thermoplastic polymer powder feedstocks are combined into a thermoplastic polymer powder feedstock mixture, with the feedstock mixture then supplied as the feedstock material to the high-velocity sprayer.

In another aspect, more than one thermoplastic polymer powder feedstock is supplied directly to the high-velocity sprayer as separate feedstock materials via one or more feedstock feedlines.

In further aspects, one or more thermoplastic polymer powder feedstocks and a conductive powder feedstock are combined to form a conductive thermoplastic polymer powder feedstock mixture that is supplied to a high-velocity sprayer as the feedstock material.

In another aspect, more than one thermoplastic polymer powder and a conductive powder are supplied directly to the sprayer as separate feedstock materials via one or more feedstock feedlines.

According to further aspects, when a thermoplastic spray formulation includes a conductive component delivered by the conductive powder feedstock, the resulting conductive thermoplastic coating delivered from the high-velocity sprayer to a substrate surface has a resistivity ranging from about $1 \times 10e^5$ to about $1 \times 10^{11}$ ohm-meter (ohm-m). More preferably, the resulting conductive thermoplastic coating delivered from the high-velocity sprayer to a substrate surface has a resistivity ranging from about $1 \times 10e^5$ to about $1 \times 10^8$ ohm-m.

Aspects of the present disclosure further contemplate, without limitation, objects, components, sub-assemblies, assemblies having substrate surfaces that include the thermoplastic coatings and conductive thermoplastic coating delivered to a substrate surface according to the methods disclosed. The objects include, for example, and without limitation, a manned aircraft, an unmanned aircraft, a manned spacecraft, an unmanned spacecraft, a manned rotorcraft, an unmanned rotorcraft, a satellite, a rocket, a manned terrestrial vehicle, an unmanned terrestrial vehicle, a manned and unmanned hovercraft, a manned surface water borne vehicle, an unmanned surface water borne vehicle, a manned sub-surface water borne vehicle, an unmanned sub-surface water borne vehicle, and combinations thereof.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
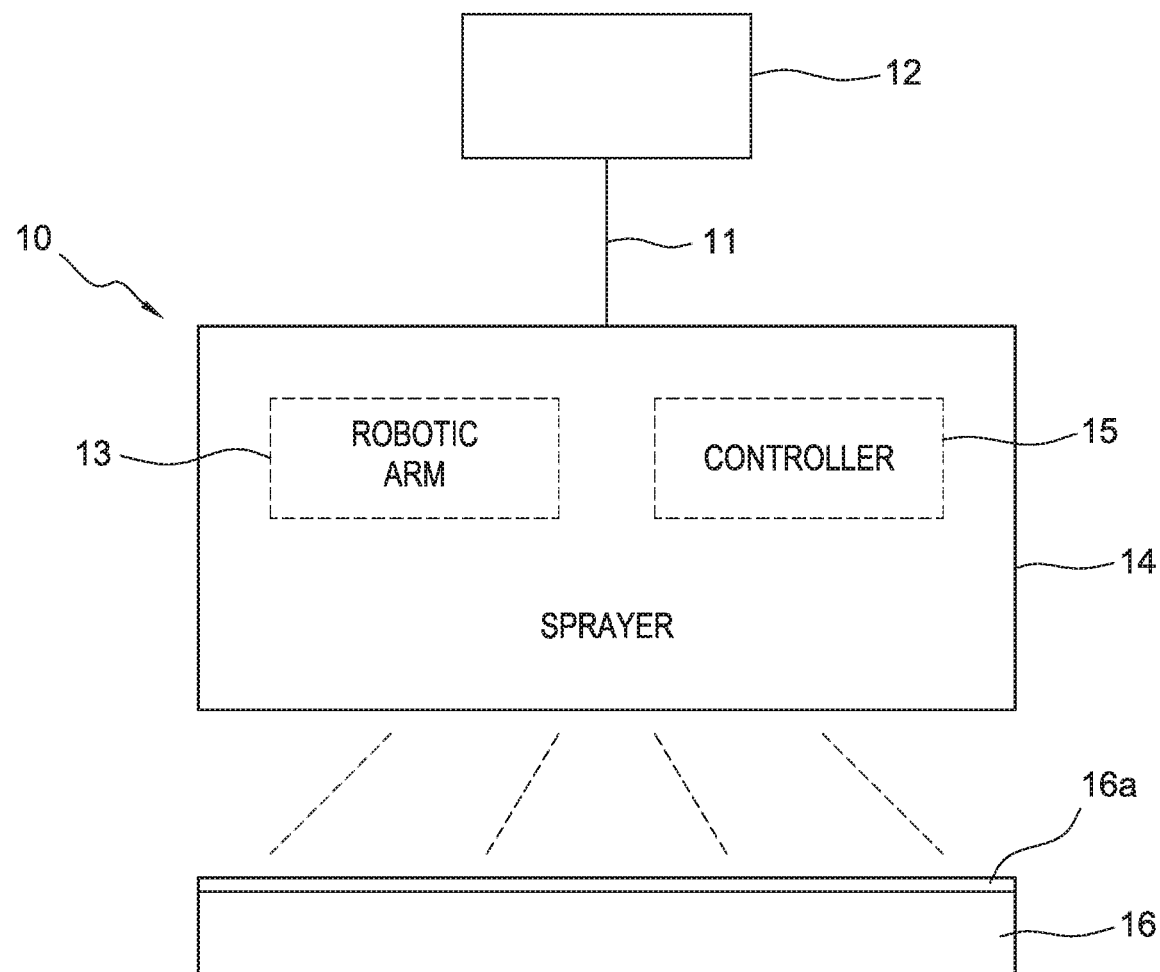
Figure 2A:
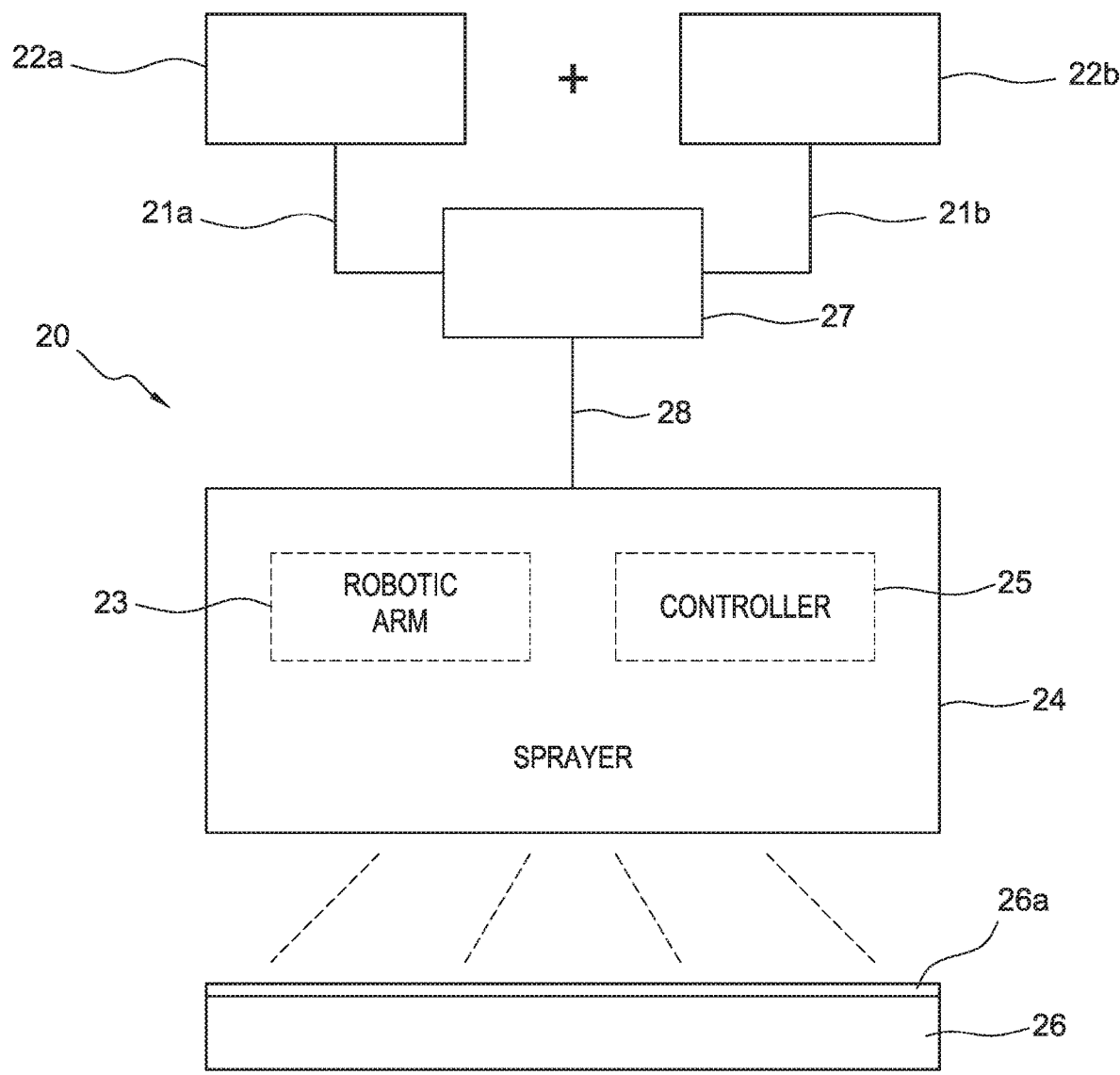
Figure 2B:
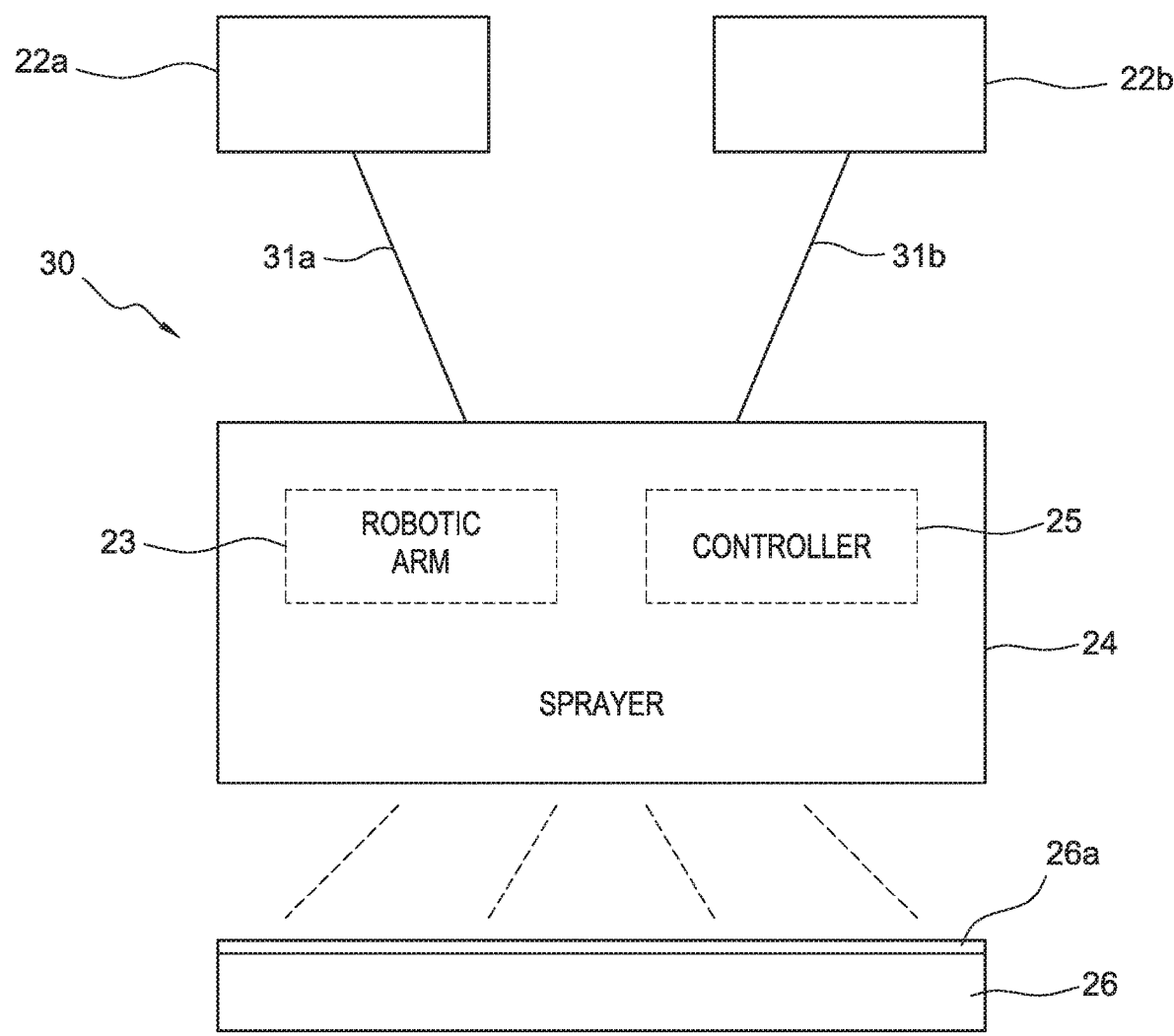
Figure 3A:
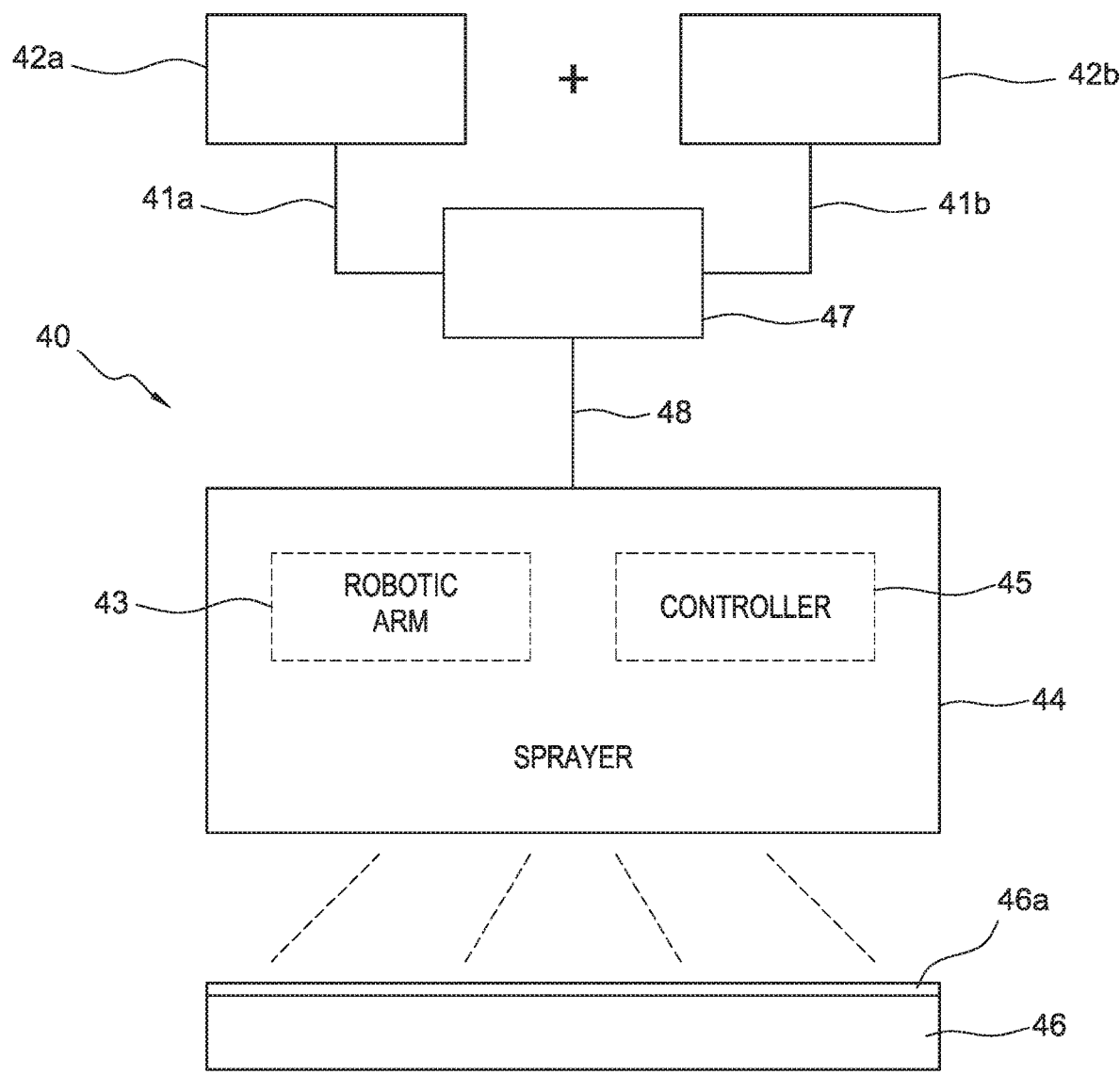
Figure 3B:
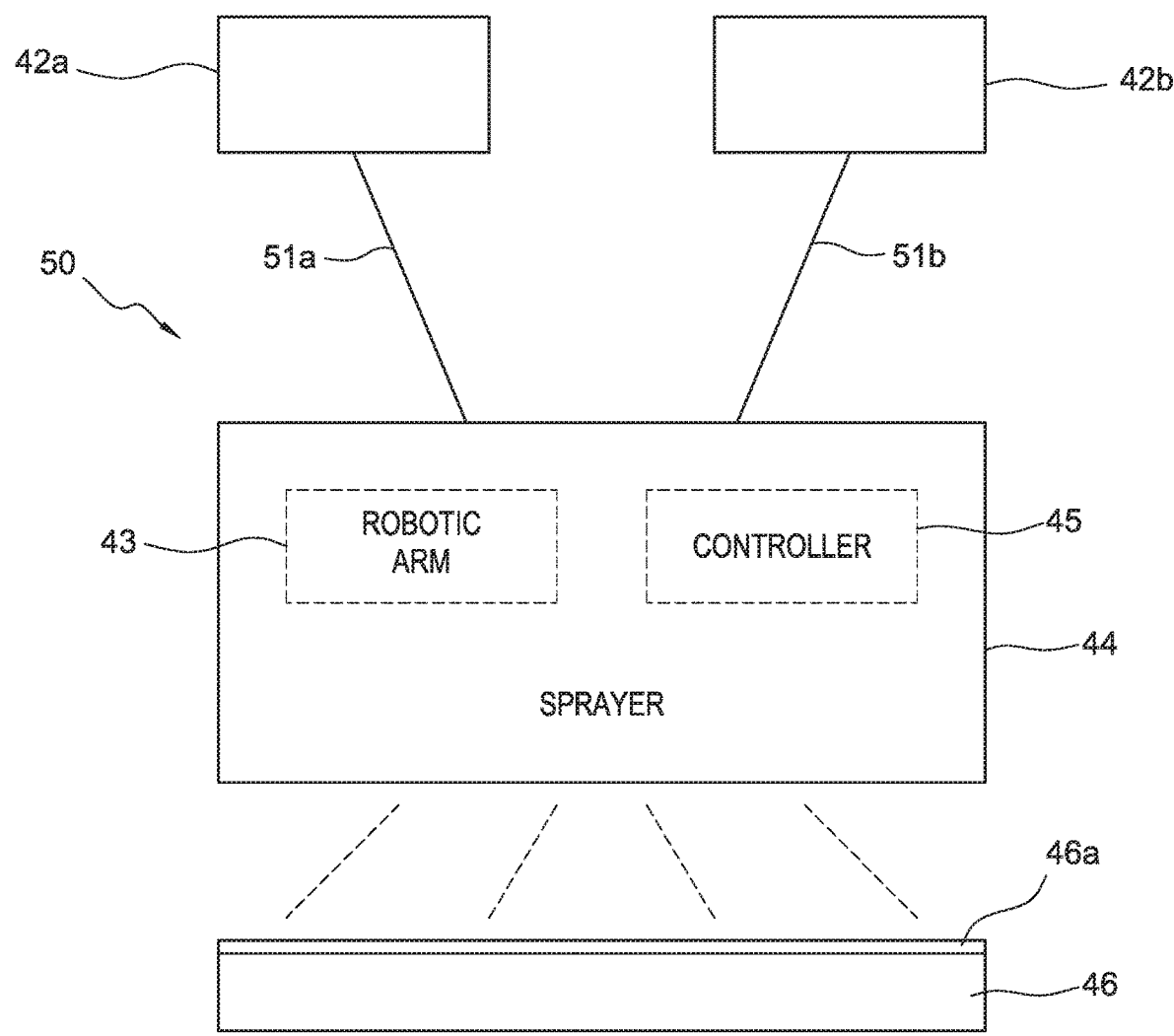
Figure 4A:
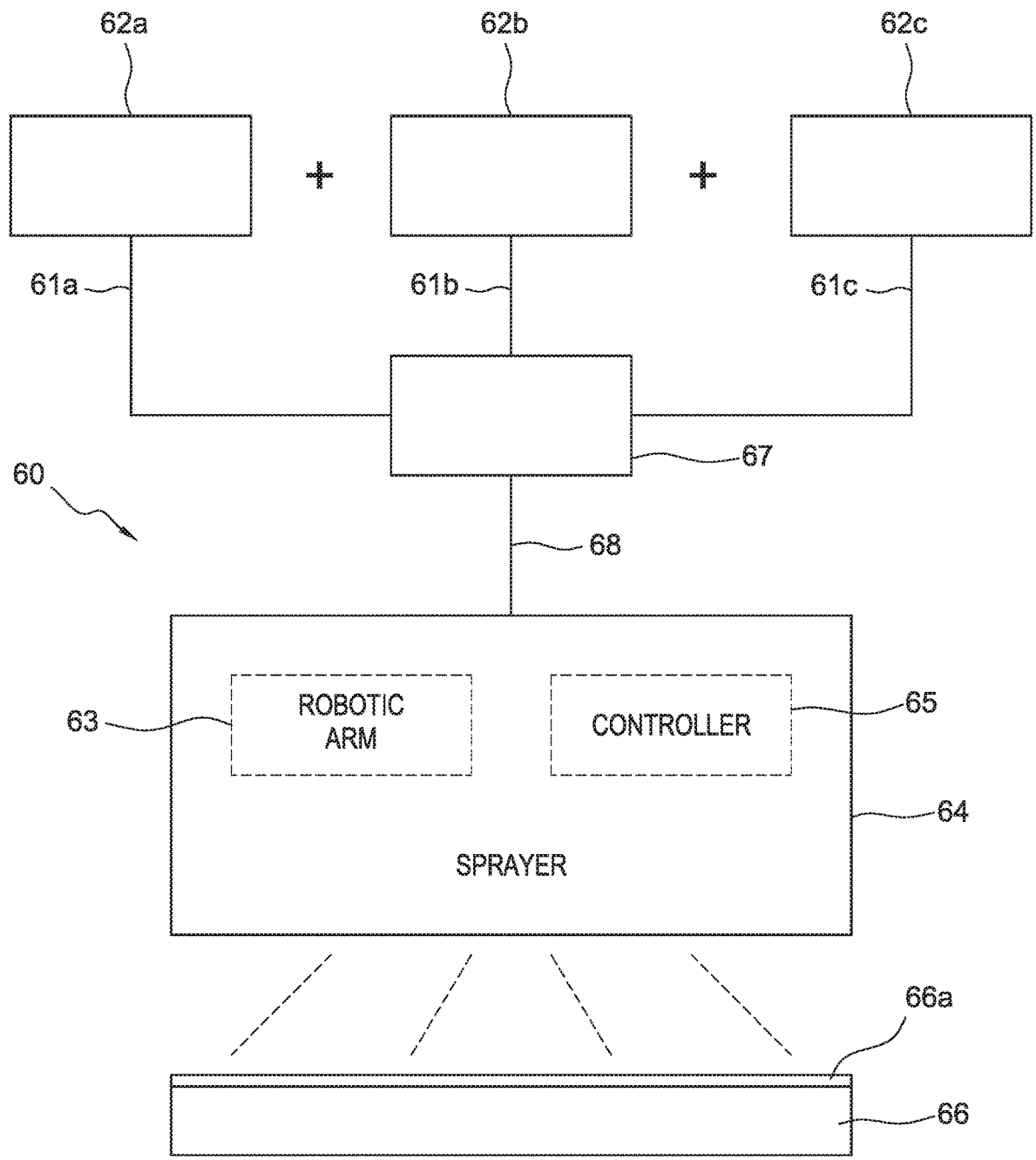
Figure 4B:
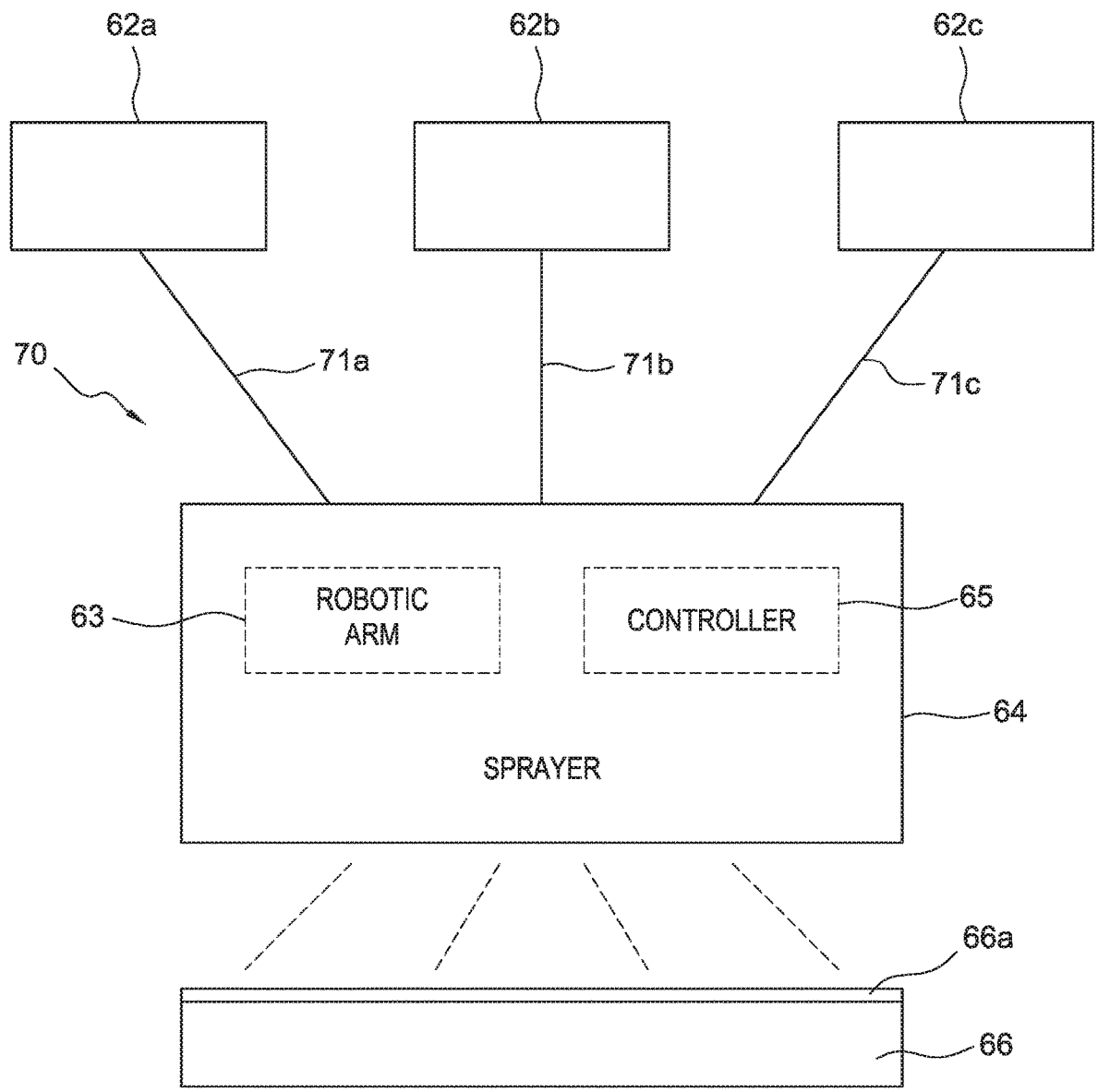
Figure 5:
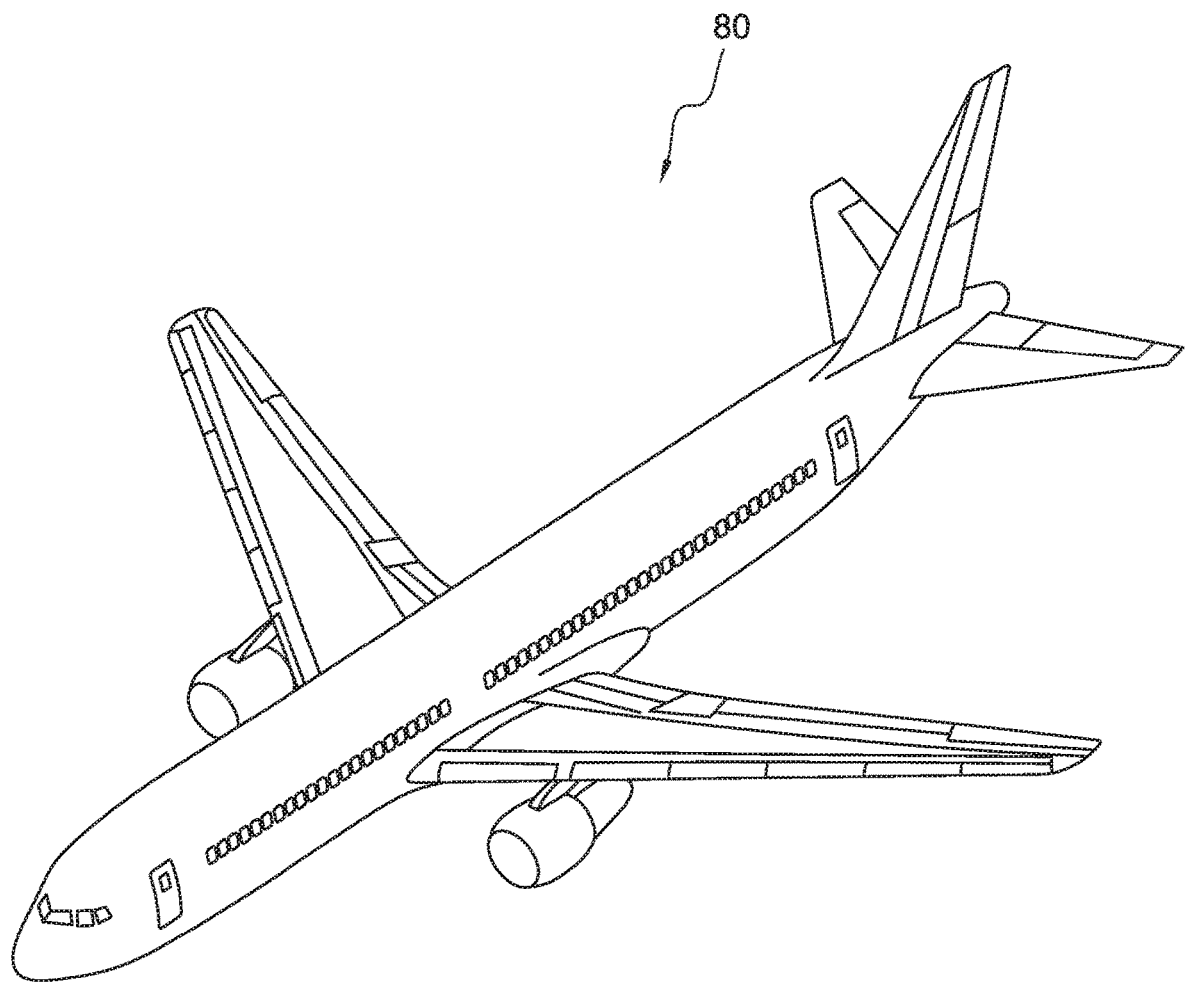
Figure 6:
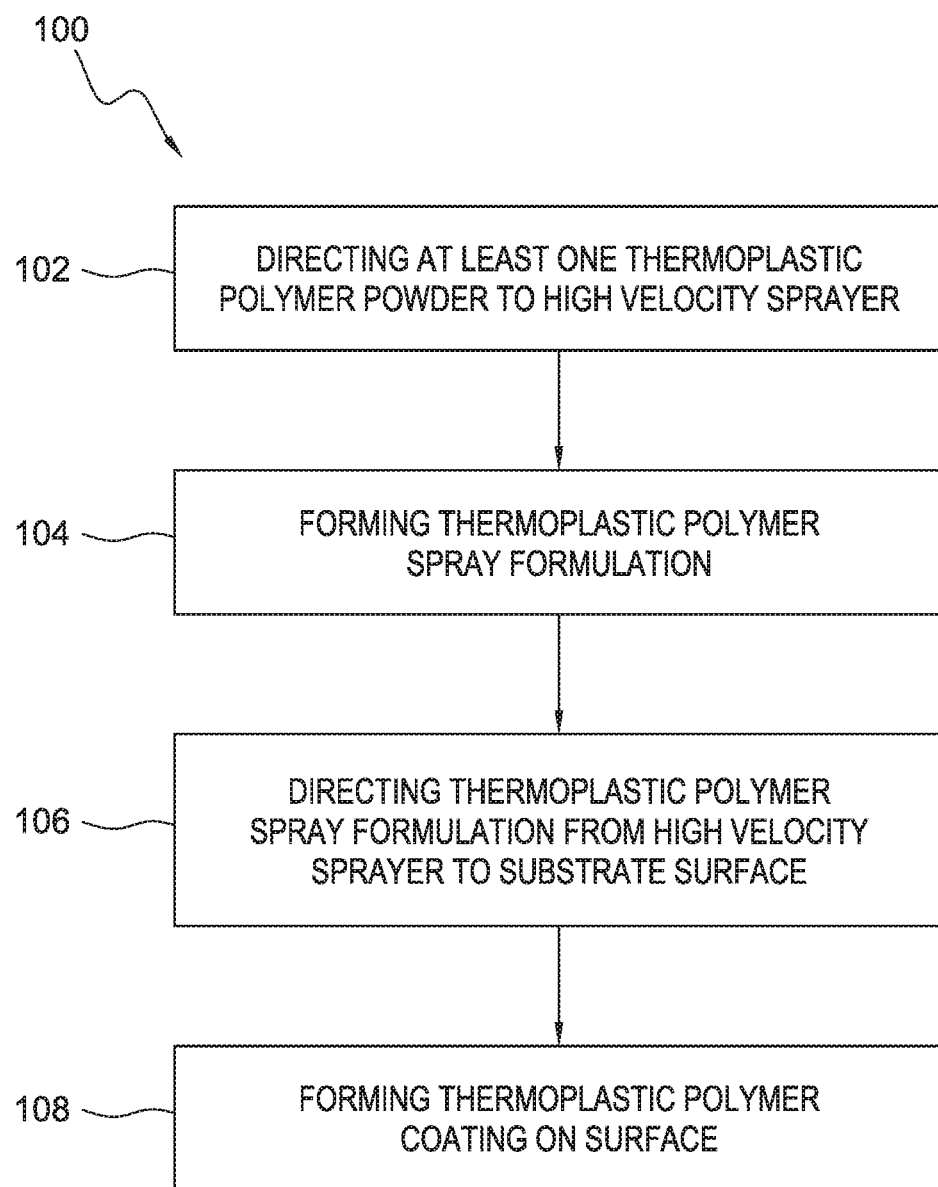
Figure 7:
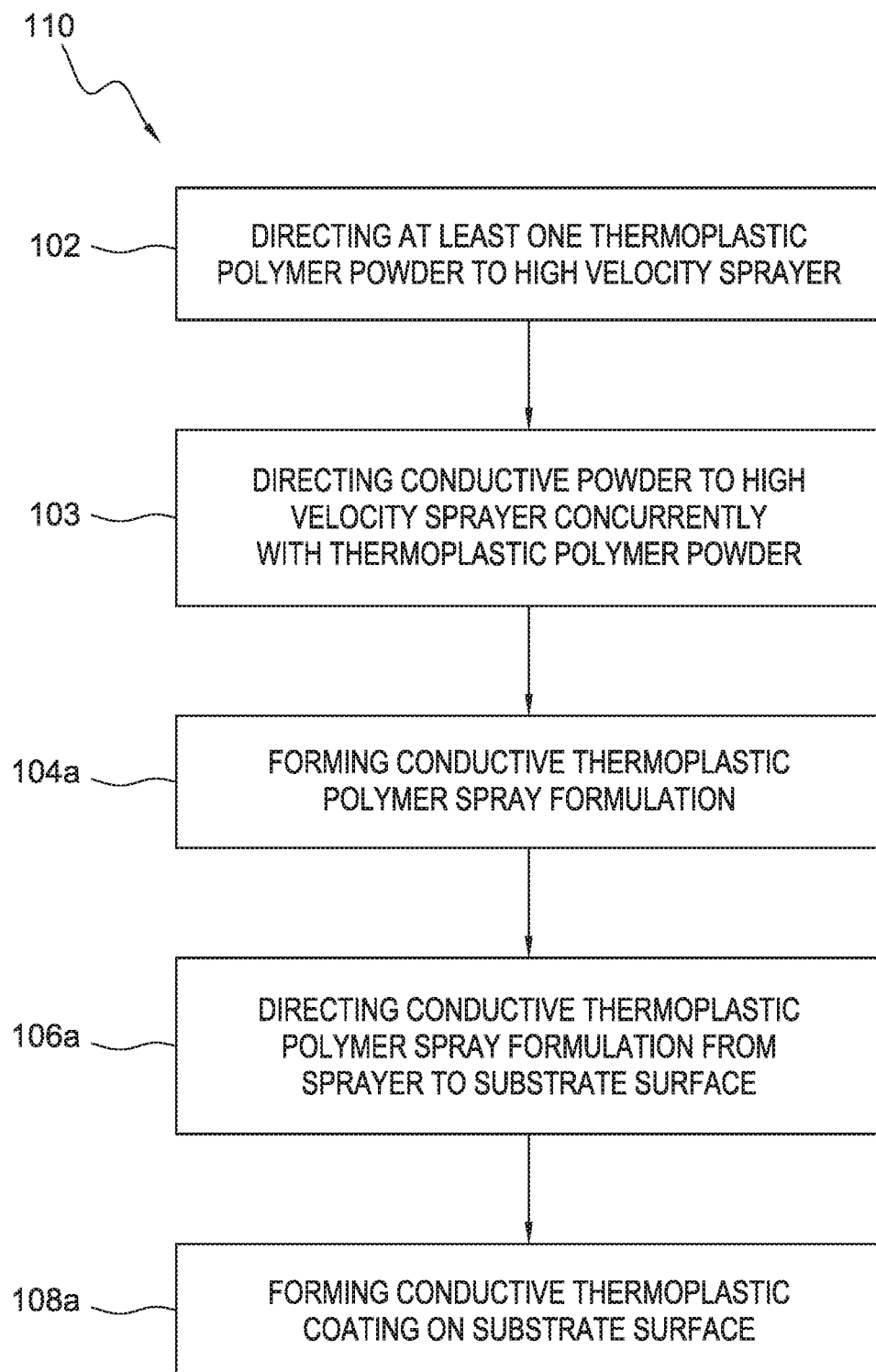
Figure 8:
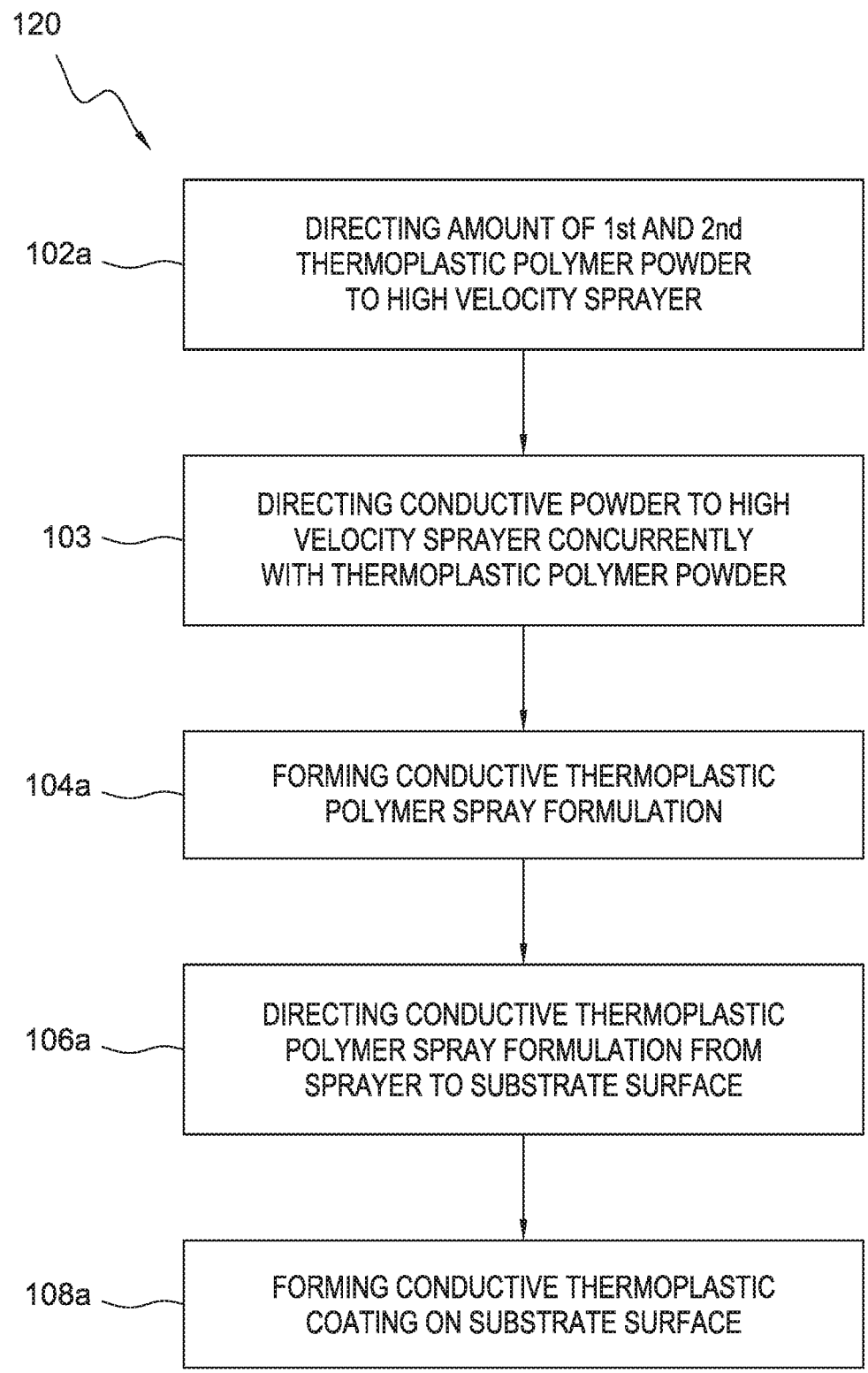

Having thus described variations of the disclosure in general terms, reference will now be made to the accompanying drawings, which are not necessarily drawn to scale, and wherein:

FIG. 1 is an illustration of an aspect of the present disclosure showing a thermoplastic polymer powder feedstock and a system including the thermoplastic polymer powder feedstock and a high-velocity sprayer for depositing a thermoplastic polymer coating onto a substrate surface;

FIG. 2A is an illustration of an aspect of the present disclosure showing the mixing of more than one thermoplastic polymer powder feedstocks to form a thermoplastic powder feedstock mixture for use as a spray formulation, and a system including the thermoplastic powder feedstock mixture and a high-velocity sprayer for depositing a tunable thermoplastic polymer coating onto a substrate surface;

FIG. 2B is an illustration of an aspect of the present disclosure showing a plurality of thermoplastic powder feedstocks delivered via separate feedlines to the sprayer shown in FIG. 2A, and a system for depositing a tunable thermoplastic polymer coating onto a substrate surface;

FIG. 3A is an illustration of an aspect of the present disclosure showing at least one thermoplastic polymer powder feedstock mixed with at least one conductive powder feedstock to form a conductive thermoplastic powder feedstock mixture, and a system including the conductive thermoplastic polymer powder feedstock mixture and a high-velocity sprayer for depositing a conductive thermoplastic polymer coating onto a substrate surface;

FIG. 3B is an illustration of an aspect of the present disclosure showing at least one thermoplastic polymer powder feedstock and a conductive powder feedstock shown in FIG. 3A, and a system including a high-velocity sprayer for depositing a conductive thermoplastic polymer coating onto a substrate surface, with more than one thermoplastic polymer powder feedstock and the one or more conductive powder feedstock delivered or directed to the sprayer via separate feed lines;

FIG. 4A is an illustration of an aspect of the present disclosure showing more than one thermoplastic polymer powder feedstocks mixed with a conductive powder feedstock to form a conductive thermoplastic powder feedstock mixture, and a system including the conductive thermoplastic polymer powder feedstock mixture and a high-velocity sprayer for depositing a conductive thermoplastic polymer coating onto a substrate surface;

FIG. 4B is an illustration of an aspect of the present disclosure showing two different thermoplastic polymer powder feedstocks and a conductive powder feedstock shown in FIG. 4A, and a system including the two different thermoplastic polymer powder feedstocks, the conductive powder feedstock and a high-velocity sprayer for depositing a conductive thermoplastic polymer coating onto a substrate surface, with the two thermoplastic polymer powder feedstocks and the conductive powder feedstock delivered or directed to the sprayer via separate feed lines;

FIG. 5 is an illustration of an aircraft comprising assemblies and subassemblies that further comprise fasteners having coatings according to aspects of the present disclosure, with the fasteners coated using systems and coated via methods according to aspects of the present disclosure;

FIG. 6 is a flowchart outing a method according to aspects of the present disclosure;

FIG. 7 is a flowchart outing a method according to aspects of the present disclosure; and FIG. 8 is a flowchart outing a method according to aspects of the present disclosure.

Figure 9:
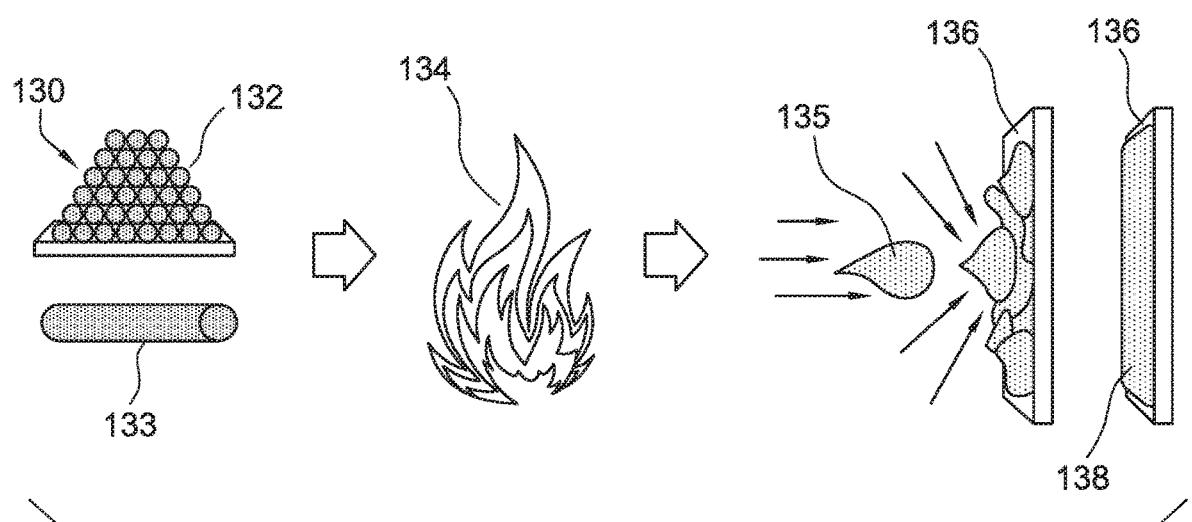
Figure 10:
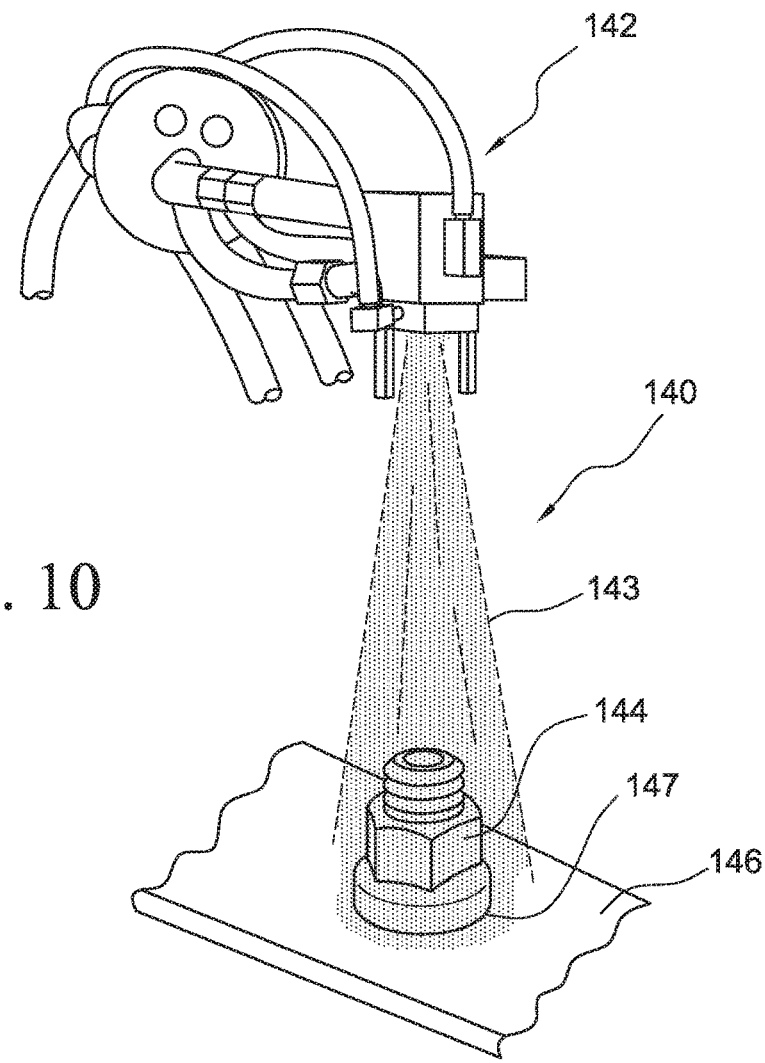
Figure 11:
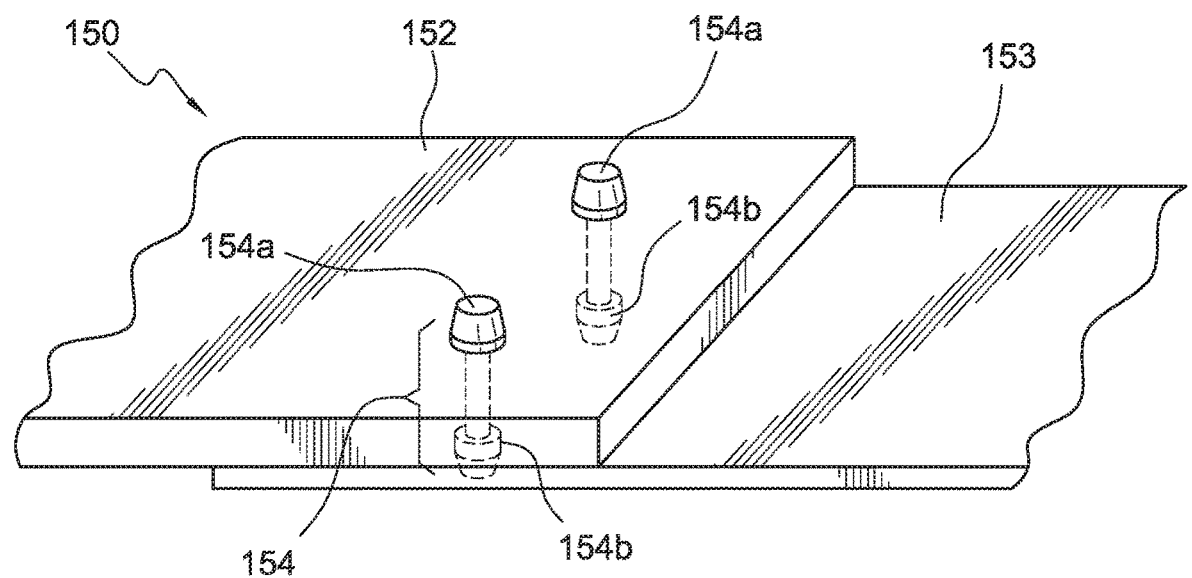
Figure 12:
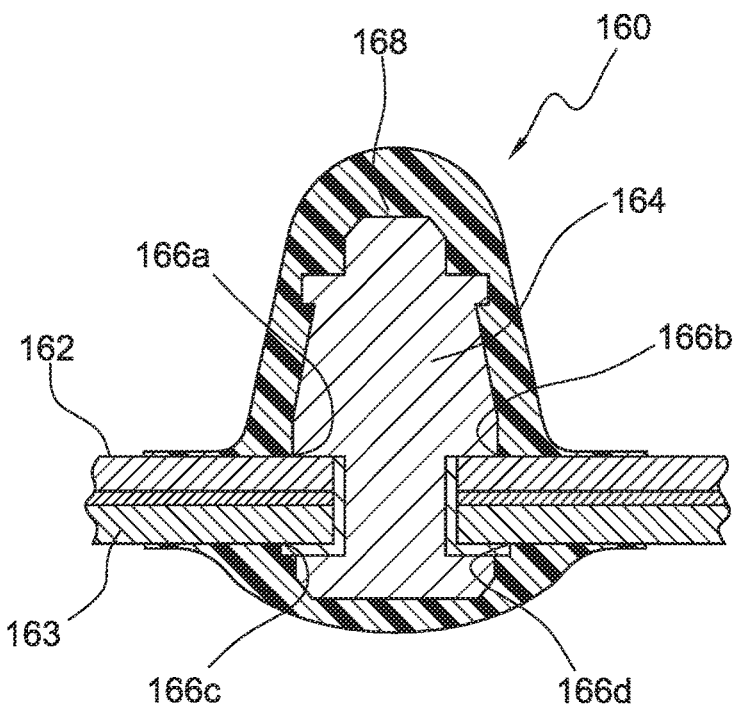
Figure 13:
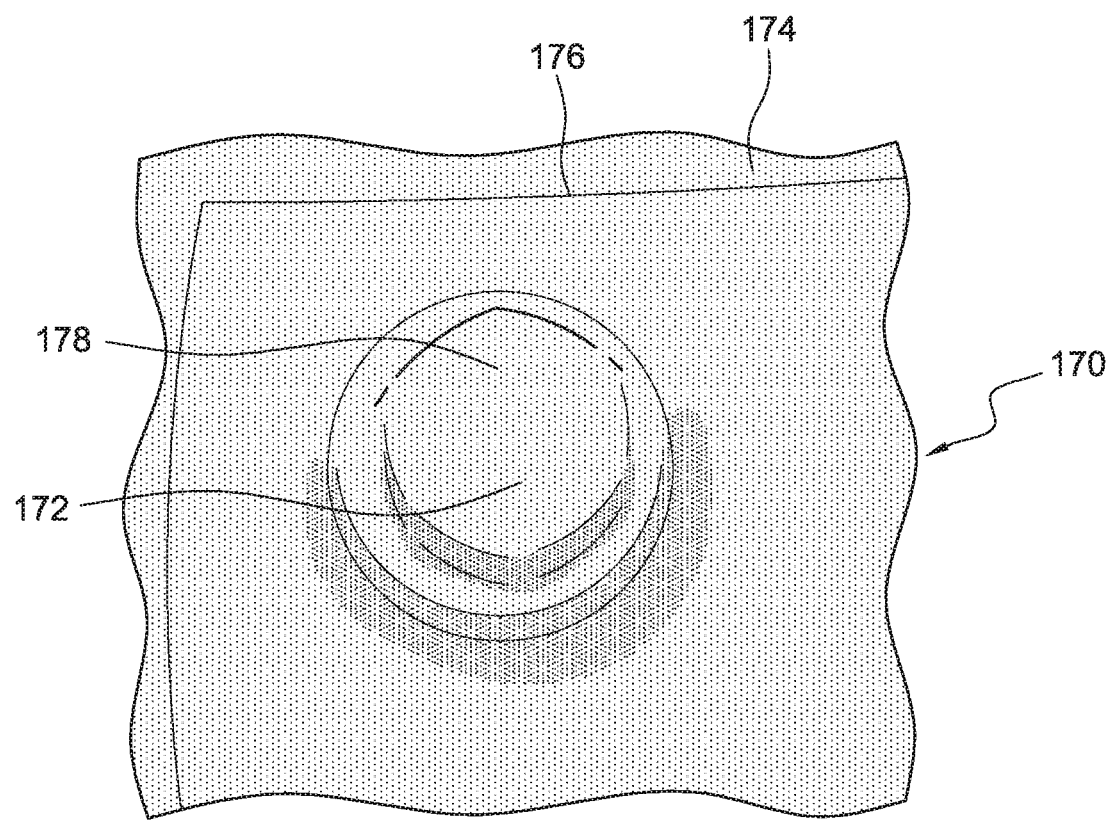
Figure 14:
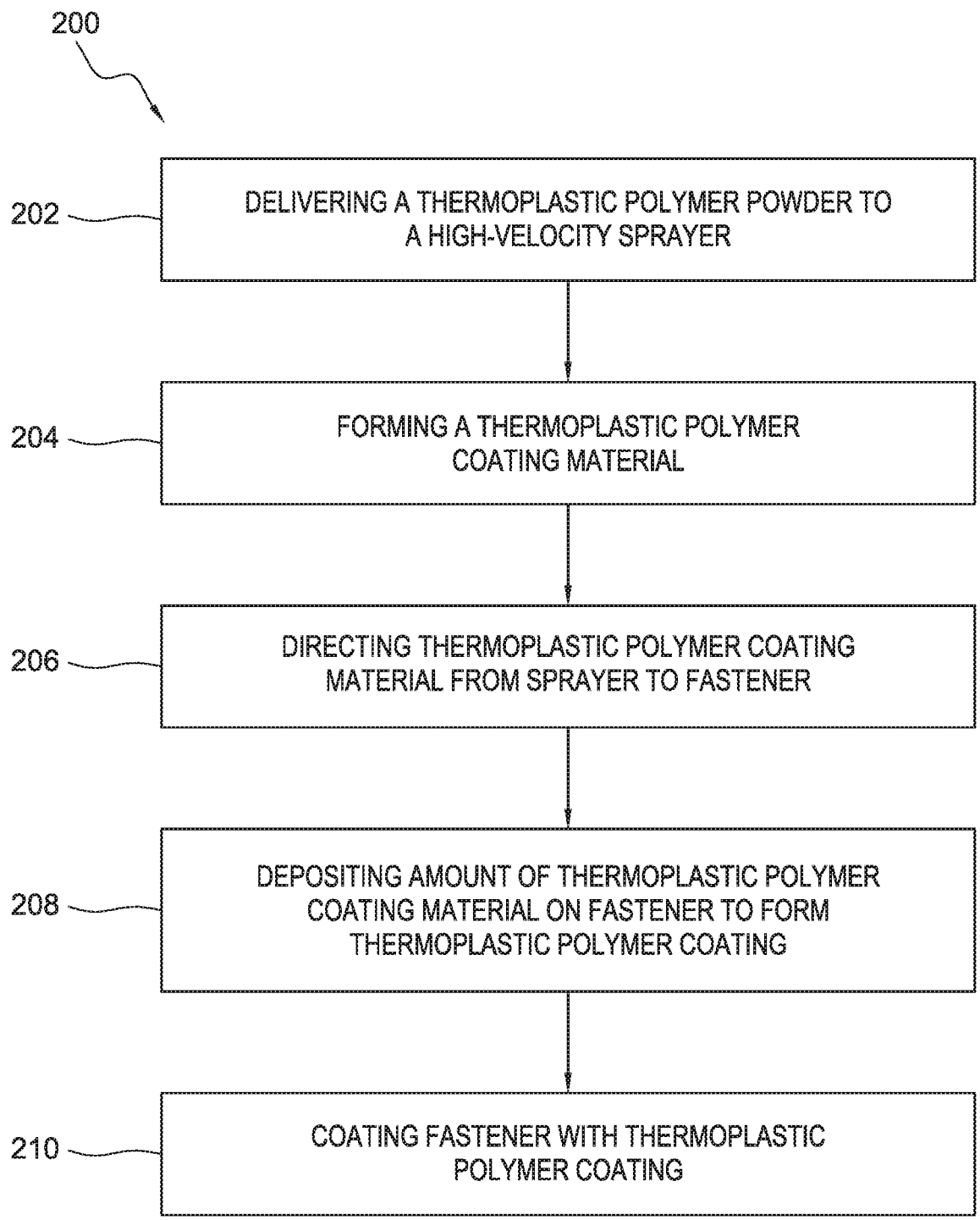
Figure 15:
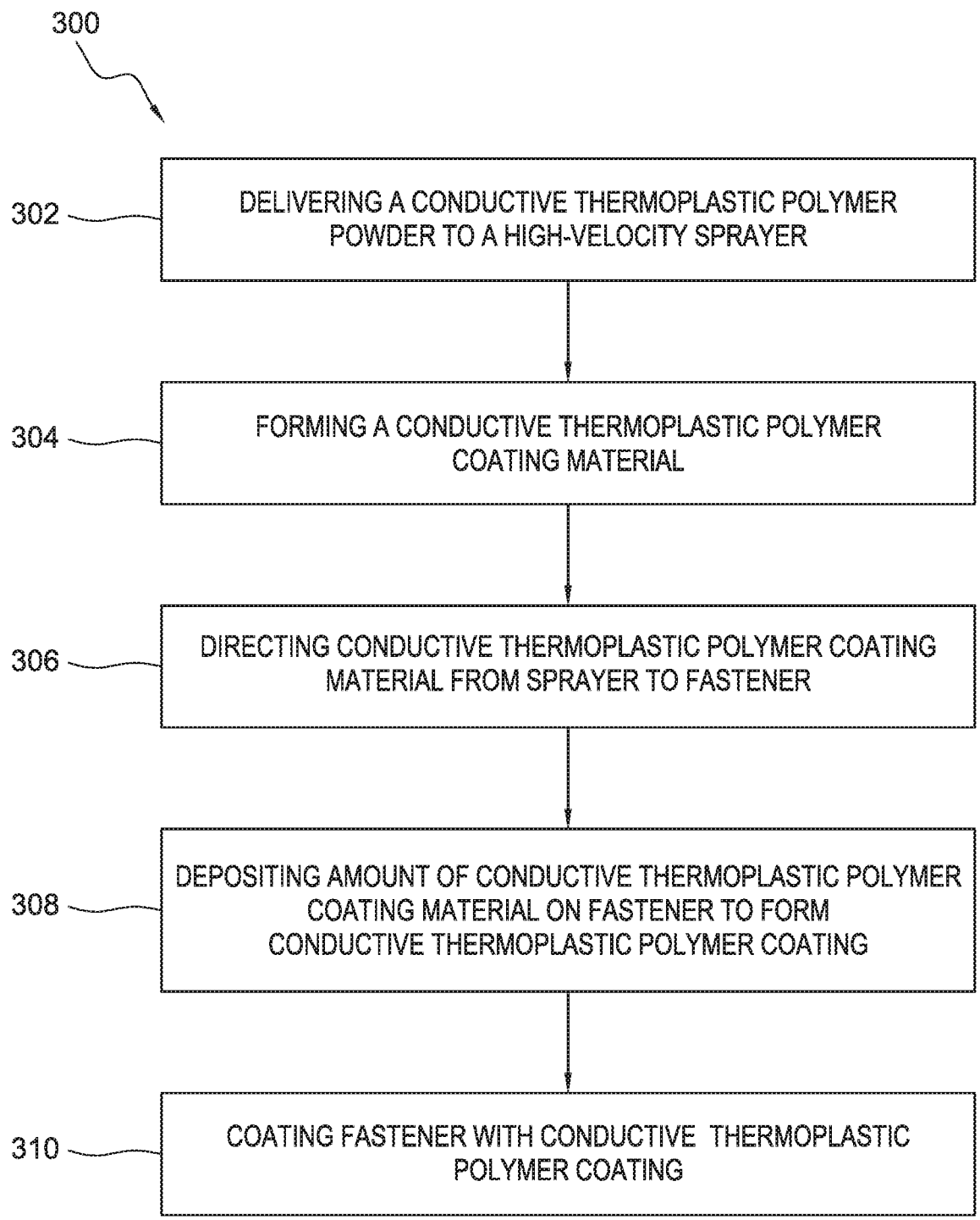

FIG. 9 is an illustration of a thermal coating process;

FIG. 10 is an illustration of an aspect of the disclosure showing a high-velocity sprayer coating the underside of a fastener in place in an assembly;

FIG. 11 is an illustration showing fasteners according to aspects of the present disclosure in position in an assembly; and FIG. 12 is a cross-sectional side view of a coated fastener in an assembly according to aspects of the present disclosure;

FIG. 13 is a top view of a coated fastener according to aspects of the present disclosure;

FIG. 14 is a flowchart outlining methods according to aspects of the present disclosure;

FIG. 15 is a flowchart outlining methods according to aspects of the present disclosure.

DETAILED DESCRIPTION

Aspects of the present disclosure are directed to powdered thermoplastic feedstock formulations that can be tunable, or otherwise have their characteristics changed in real time during deposition and that can include conductive materials and that can be conductively tunable. The powdered thermoplastic polymers powder feedstocks include powdered polymers that include at least one conductive powdered material that can be deposited onto a substrate surface via a high-velocity sprayer to form a thermoplastic coating on a substrate surface, with the coating having predetermined characteristics.

Aspects of disclosed powdered conductive thermoplastic coating formulations that contain a conductive powder and that can be tuned or tailored, including in real time, provide a wide range of required characteristics for electrically conductive thermoplastic coatings offering a particular, and wide-ranging amount of resistivity or conductivity, while also providing robust protective qualities to the substrates being coated with the presently disclosed conductive thermoplastic coatings.

Additionally, aspects of the present disclosure are directed to thermoplastic coating formulations that can be tailored to deliver a thermoplastic coating using high-velocity spraying techniques to metallic and non-metallic substrates and components, with the thermoplastic coatings having predetermined characteristics. When a conductive powdered feedstock material is present in the thermoplastic polymer powder feedstock, various characteristics of the resulting applied conductive thermoplastic coatings can be predictably tailored, even in substantially real-time, by changing the proportions of powdered feedstock constituents (e.g. the at least one thermoplastic polymer powder feedstock and the conductive powder feedstock) that are provided to the high-velocity sprayer.

Without being limiting, the average particle size of the thermoplastic polymer powders used according to aspects of the present disclosure range from about 20 µm to about 300

μm. In addition, without being limiting, the average particle size of the conductive powders used according to aspects of the present disclosure range from about 5 μm to about 80 μm. The high-velocity sprayers used in connection with aspects of the present disclosure include sprayers able to disperse a feedstock at velocities ranging from about 20 m/s to about 1200 m/s. Such sprayers include thermal (e.g., flame sprayers, etc.) and cold sprayers.

Aspects of the present disclosure are directed to powdered thermoplastic formulations that can be tunable, or otherwise have their characteristics changed in real time during deposition and that can include conductive materials and that can also be conductively tunable. The powdered thermoplastic polymer feedstocks can include at least one conductive powdered material to form a conductive thermoplastic powder feedstock mixture that can be deposited onto a substrate surface via a high-velocity sprayer to form a tunable conductive thermoplastic coating on a substrate surface, with the conductive thermoplastic coating having predetermined characteristics.

Aspects of disclosed thermoplastic polymer powder powdered conductive coating formulations can be tuned or tailored, including in real time, to provide a wide range of required coating characteristics, while also providing robust protective coating qualities to the substrates being coated with the presently disclosed thermoplastic coatings.

According to further aspects, powdered conductive thermoplastic polymer coating formulations (that contain a conductive powder) can be tuned or tailored, including in real time, and provide a wide range of required characteristics for electrically conductive thermoplastic coatings offering a particular, and wide-ranging amount of resistivity or conductivity, while also providing robust protective qualities to the substrates being coated with the presently disclosed conductive thermoplastic coatings.

Additionally, aspects of the present disclosure are directed to thermoplastic polymer powder coating formulations that can be tailored as precursor feedstock mixtures, or that can be delivered substantially concurrently or in predetermined sequence to a sprayer (e.g., a predetermined programmed sequence) from separate feedstock sources or supplies to a high velocity sprayer. The sprayer then delivers the thermoplastic polymer powder coating formulations to form a thermoplastic coating, using high-velocity spraying techniques, to metallic and/or non-metallic substrates and components, with the thermoplastic coatings having predetermined characteristics that can be tuned in real time (e.g., in real time during application to a substrate surface, etc.). When a conductive powdered feedstock material is present in the thermoplastic polymer powder feedstock, various characteristics of the resulting applied conductive thermoplastic coatings can be predictably tailored, even in substantially real-time, by changing the proportions of powdered feedstock constituents (e.g., the proportion(s) of the at least one thermoplastic polymer powder feedstock and the conductive powder feedstock) that are provided to the sprayer.

Without being limiting, the average particle size of the thermoplastic polymer powder feedstock(s) used according to aspects of the present disclosure range from about 20 μm to about 300 μm. In addition, without being limiting, the average particle size of the conductive powder feedstock(s) used according to aspects of the present disclosure range from about 5 μm to about 80 μm. The high-velocity sprayers used in connection with aspects of the present disclosure include sprayers able to disperse a feedstock at velocities ranging from about 20 m/s to about 1200 m/s. Such sprayers include thermal (e.g., flame sprayers, etc.) and cold sprayers.

According to one aspect, the thermoplastic polymer powder comprises at least one of a nylon, polyetheretherketone (equivalently referred to as PEEK), polyetherketoneketone (equivalently referred to as PEKK), polyamide, polyphenylsulfide, polyphenylsulfone, polysulfone, and polyetheramide.

In further aspects, the thermoplastic polymer powder feedstock comprises at least one of a thermoplastic polyester elastomer powder or a thermoplastic fluoroelastomer powder. Contemplated thermoplastic elastomer powders include those that can be obtained as PEEK, PEKK, Hytrel® 5526 (DuPont); Dai-El™, (Daikin®); Hipex®, (Kraiburg), etc. The thermoplastic polymer powder feedstocks preferably have an average particle size ranging from about 20 μm to about 300 μm.

Polyether ether ketone (PEEK) is an organic thermoplastic in the polyaryletherketone (PAEK) family, with PEEK having the general formula:

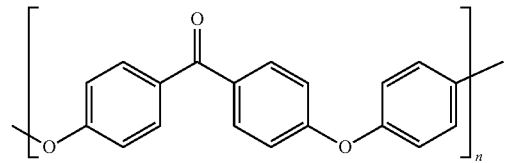

PEEK has a coefficient of thermal expansion value (depending upon grade) ranging from of about 20 to about 80 ppm/° F. (i.e. about 2 to about $8\times10^{-5}$ in./in/° F.), a Young's modulus value of about 3.6 GPa and a tensile strength ranging from about 90 MPa to about 100 MPa. PEEK is highly resistant to thermal degradation as well as attack by both organic and aqueous environments (e.g. environments including, without limitation, those environments coming into contact with fuels and fuel systems, etc.), and has a high resistance to biodegradation.

According to another, and as also presented in the Examples below, ret polymer powder. Polyetherketoneketone (PEKK) is a semi-crystalline thermoplastic in the PAEK family, with PEKK having the general formula:

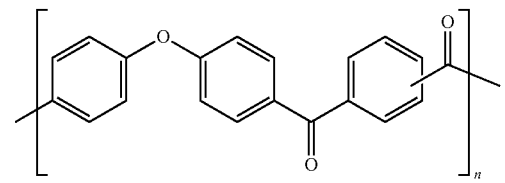

PEKK has a coefficient of thermal expansion value (depending upon grade) of about 10 to about 20 ppm/° F. (i.e. about 1 to about $2\times10^{-5}$ in./in/° F.), a Young's modulus value of about 4.5 GPa and a tensile strength of about 102 MPa. PEKK is also highly resistant to thermal degradation as well as attack by both organic and aqueous environments (e.g. environments including, without limitation, those environments coming into contact with fuels and fuel systems, etc.), and has a high resistance to biodegradation.

The density of the contemplated thermoplastic polymer coating deposited onto a substrate surface can be of any desired thickness, but is particularly deposited at a thickness ranging from about 25 μm to about 5 mm, with the contemplated thermoplastic coatings having a material density ranging from about 1.0 g/cc to about 1.8 g/cc). Being able to deposit a thermoplastic coating having such tailorable and predetermined densities and deposited to such desired thicknesses at reduced densities realizes substantial weight reduction compared with material coatings presently used in, for example, aircraft production where overall weight impacts vehicle range, fuel consumption, available cargo capacity, manufacturing time, etc., all of which can impact total production cost.

If desired, according to further contemplated aspects, the thermoplastic coatings (and when conductive components are present to form conductive thermoplastic coatings, such resulting conductive thermoplastic coatings) can be tailored or "tuned", for example, in real time during the coating deposition process, such that the deposited coatings possess various desired and predetermined characteristics, e.g., physical, chemical, thermal, etc. Such aforementioned tailorable characteristics are in addition to the desired and tailorable conductivity or resistivity values achievable with the presently disclosed conductive thermoplastic coatings. This can be achieved by providing differing powdered thermoplastic polymer feedstock(s), differing amounts (e.g., differing comparative ratios, etc.) of differing powdered thermoplastic polymer feedstock(s), additional numbers of differing powdered thermoplastic polymer feedstock(s), or by providing additives to the powdered thermoplastic polymer feedstock(s).

According to other aspects, contemplated conductive powder feedstock materials include, without limitation, various metallic powders including titanium, nickel alloy, copper, carbon black, graphene powder, or carbon nanotubes. The contemplated conductive powder feedstock materials preferably have an average particle size ranging from about 5 nm to about 80 nm.

The powdered thermoplastic polymer feedstock formulations disclosed, according to aspects of the present disclosure, when combined or otherwise mixed with one or more conductive powder feedstock(s) produce a resulting conductive thermoplastic polymer feedstock mixture that yields a conductive thermoplastic polymer coating on a substrate surface, with the resulting conductive coating having a desired and predetermined resistivity ranging from about $1 \times 10e^5$ to about $1 \times 10^{11}$ ohm-m, and more preferably from about $1 \times 10e^5$ to about $10e^8$ ohm-m.

To provide a conductive thermoplastic coating on a substrate surface having a resistivity ranging from about $1 \times 10e^5$ to about $1 \times 10^{11}$ ohm-m, the conductive thermoplastic polymer powder feedstock(s) have a relative percentage by volume of the conductive component (e.g. the conductive powder) ranging from about 1% to about 9% by volume of the total volume of conductive thermoplastic polymer powder provided to the sprayer.

It is further understood that the thermoplastic polymer powder (e.g., provided as a feedstock to the sprayer) can be a mixture that is formed prior to the introduction of the multi-component feedstock to the sprayer. In one aspect, when the powdered feedstock comprises more than one type of powder component (e.g. more than one thermoplastic polymer powder feedstock; one thermoplastic polymer powder feedstock and at least one type of conductive powder feedstock; more than one thermoplastic polymer powder feedstock and at least one type of conductive powder feedstock, etc.), the multiple component powder feedstock materials can be mixed together to form a thermoplastic (or conductive thermoplastic) polymer powder mixture, or "feedstock mixture". The feedstock mixture is then introduced as the feedstock to the sprayer. For the purpose of the present disclosure, the term "feedstock" refers to a precursor material that is supplied from a supply of a material to a mixture, or is supplied directly to a sprayer via a feed line from a supply of a material.

In an alternate aspect, when the powdered feedstock comprises more than one type of powder component (e.g., more than one thermoplastic polymer powder feedstock; one thermoplastic polymer powder feedstock and at least one conductive powder feedstock; more than one thermoplastic polymer powder feedstock and at least one conductive powder feedstock, etc.), the multiple powdered feedstock components can be directed via separate feed lines to the sprayer, such that no multiple component powdered feedstock mixture is pre-formed as a single feedstock that is then provided to the sprayer. According to this aspect, one or more controllers can be used to monitor and control the rate at which a single powdered feedstock is released from a supply and directed to the sprayer. In this way, the individual flow rate of a particular powdered feedstock component is controlled, monitored and maintained to insure that a particular ratio of feedstock components that arrive at (e.g., are delivered to) the sprayer is achieved and, if desired, maintained for the duration of the material (e.g. coating) spray deposition onto a substrate surface. For example, in this aspect, to produce a conductive thermoplastic coating having a resistivity ranging from about $1 \times 10e^5$ to $10e^8$ ohm/m, the presence of an amount of conductive powder feedstock delivered to the sprayer ranges from about 1% to about 9% by volume of the combined powdered material feedstock delivered to the sprayer (e.g., the combined powdered material volume equaling the volume of thermoplastic polymer powder feedstock combined with the conductive powder feedstock volume, and, for example, controlled, monitored and maintained by regulating the comparative flow rates of the individual component feedstocks fed via one or more feed lines to the sprayer, etc.).

According to present aspects, a formed conductive thermoplastic polymer powder feedstock mixture becomes the thermal sprayer feedstock material that is converted by the thermal sprayer into a conductive coating or conductive sealant that is desirably applied (via the thermal sprayer) to a metal, non-metal, or metal/non-metal interface at, for example, a fastener, or a joint, or to a component edge as an edge seal. The comparative amount of conductive powder that is selected and added to the thermoplastic powder to form the conductive thermoplastic powder mixture, is selected to achieve a particular conductive effect in the eventual conductive thermoplastic coating and/or conductive thermoplastic sealant that is deposited onto a substrate in the form of a conductive coating or conductive sealant. That is, by tailoring the amount of conductive powder added to form the form the thermoplastic powder mixture used as the thermal sprayer feedstock material, the resulting material exiting the thermal sprayer and deposited onto a substrate surface will become a coating or sealant having a particularly preselected resistivity on the substrate surface.

The tailorable conductive thermoplastic coatings that are obtained according to aspects of the present disclosure provide conductive flexibility with respect to dissipating static charges that build up with and along a particular material, or are caused by significant electrical events including, for example, lightning strikes. In addition, the conductive thermoplastic coatings disclosed herein have significant advantages commensurate with thermoplastic coatings in terms of ease of handling, ease of application, retention and adhesion characteristics, safety due to lower toxicity (e.g., as compared with polysulfides and chromates, etc.), etc.

Still further, since the presently disclosed conductive coatings are thermoplastic in nature, the conductive thermoplastic coatings or sealants do not require a separate curing step after application. In other words, the thermoplastic coatings/sealants will "set" upon cooling and require no subsequent curing protocol or regimen to "set up". The disclosed thermoplastic polymer coatings and conductive thermoplastic polymer coatings can be fabricated to further comprise a particular color to, for example, facilitate inspection with respect to both initial application quality as well as repair and maintenance inspections that will be conducted at various quality control and servicing intervals. Still further, if repair or replacement of a thermoplastic polymer coated part or surface (or a conductive thermoplastic polymer coated part or surface) is required, such coated parts or the coatings on such coated parts can be more easily removed using various solvent or mechanical removal as compared to, for example, epoxy- or acrylamide-based coatings and/or sealants that require curing regimens.

With respect to adhesion, the conductive coatings/sealants of the present disclosure have adhesion values ranging from about 5 lbs/in to about 50 lbs/in wide area on both metals and non-metals when performing adhesion testing set forth in ASTM D6862-11(2016) Standard Test Method for 90° Peel Resistance.

In this way, the thermoplastic coating and sealant systems disclosed herein combine the benefits of thermoplastic material characteristics with high-velocity spray techniques and systems (e.g., thermal flame spraying and cold spraying), and the deposited thermoplastic coating and sealant characteristics are further tailorable to a desired end use as coatings and/or sealants on a substrate surface. When a conductive powder feedstock component is added to the thermoplastic powder feedstock, the conductive coatings deposited to a substrate surface have electrical characteristics (e.g., conductivity, resistivity, etc.) that can also be tailored as required for their intended use as conductive coatings, particularly as coatings and/or sealants on homogeneous or hybrid surfaces comprising metallic and/or non-metallic components.

According to a further aspect, the presently known thermal and cold spray equipment and systems can be retrofitted to deposit coatings made from the presently disclosed thermoplastic formulations that can also include conductive materials to form conductive thermoplastic coatings. Particularly preferred thermal sprayers include flame sprayers.

Thermal spraying techniques are coating processes where melted or heated materials are sprayed onto (e.g., deposited onto) a surface. Feedstock material is supplied to the sprayer as a coating precursor. The feedstock is heated by electrical (e.g., plasma or arc) or chemical means (e.g., combustion flame). Thermal spraying can achieve coatings having a coating thickness ranging from about 20 μm to about 5.0 mm over a large area and at a high deposition rate as compared to other known coating processes, with the presently contemplated deposition rate ranging, for example, from about 20 μm on 1 ft$^2$ in 10 seconds, or greater, etc., or coatings deposited at a rate ranging from about 1 to about 50 grams/second, (g/s), etc.

Flame spray coating refers to a type of thermal spraying where melted or heated feedstock materials are sprayed onto a substrate surface. The feedstock (e.g., the coating precursor material) is heated by electrical (e.g., plasma or arc) or chemical means (e.g., combustion flame). During coating processes the substrate preferably undergoes no distortion, as the substrate temperature remains below about 250° F. during the spray operation. When the substrate is metallic, the substrate is not metallurgically altered. Coating thickness ranging from about 2 μm to 5.0 mm can be achieved, with deposition (e.g., coating application) rates for such thicknesses ranging from at least about 20 μm on 1 ft$^2$ in 10 seconds, or greater; or coatings deposited at a deposition rate ranging from about 1 to about 50 grams/second (g/s), etc.

Without limitation, thermal (e.g., flame, etc.) sprayers useful according to present aspects include, for example, TAFA Models 5220 HP/HVOF®, 8200 HP/HVOF®, 825 JPid HP/HVOF® (ID), 7780 (UPCC), JP-8000 HP/HVOF®, JP-5000® HP/HVOF® (Praxair, Inc., Danbury, Conn.); Powderjet 86, Powderjet 85 (Metallizing Equipment Co. Pvt. LTD. (Jodhpur, India) Plasma Technology Inc., Torrence, Calif.): and systems available from Plasma Technology Inc. (Torrence Calif.), etc. Universal Flame Spray System PG-550 (Alamo Supply Co., Ltd., (Houston, Tex.), etc. Various controllers can be used in conjunction with the TAFA systems described including, for example, TAFA Model 7700GF HVOF System (Praxair, Inc., Danbury, Conn.).

In contrast with the flame sprayer systems mentioned above, in "cold spray" systems powder particles (e.g., feedstock particles) typically having an average particle size ranging from about 10 μm to about 40 μm, and are accelerated to very high velocities (200 to 1200 m/s) by a supersonic compressed gas jet at temperatures below their melting point. Upon impact with the substrate, the particles experience extreme and rapid plastic deformation that disrupts the thin surface oxide films that are present on all metals and alloys. This allows intimate conformal contact between the exposed substrate surfaces under high local pressure, permitting bonding to occur with the layers of deposited material. The layers of deposited material can be built up rapidly, with very high deposition efficiency (e.g., above 90% in some cases). Using cold spray systems, materials can be deposited without high thermal loads, producing coatings with low porosity and oxygen content. Without limitation, cold sprayers useful according to present aspects include, for example, Impact Spray System 5/8; Impact Spray System 5/11 (Impact Innovations Waldkraiburg, Germany), etc.

Cold spray processes refer to the thermal spray processes and collectively refers to processes known as cold gas dynamic spraying, kinetic spraying, high velocity particle consolidation (HPVC), high velocity powder deposition, supersonic particle/powder deposition (SPD), and the like. In cold spraying, a high velocity gas jet, for example, a deLaval converging/diverging nozzle can be used to accelerate powder particles generally having an average particle size ranging from about 1 μm to about 50 μm. The particles are accelerated by the gas jet at a temperature that is below the melting point of the feedstock material particles. The particles are then sprayed onto a substrate that can be located about 25 mm from the nozzle. The particles impact the substrate and form a coating. Without being bound by a particular theory, it is believed that the kinetic energy of the particles, rather than an elevated temperature causes the particles to plastically deform on impact with the substrate surface to form "splats" that bond together to produce the coating. The coatings formed from the cold sprayed particles are formed in the solid state, and not via the melting followed by solidification as occurs in thermal spray processes (e.g., flame spraying, etc.) using elevated temperature. Such a cold spray process avoids deleterious effects that can be caused by high temperature deposition, including, for example, high-temperature oxidation, evaporation, melting, crystallization, residual stress, gas release, etc. As a result, according to present aspects, cold spraying can be advantageously used for temperature sensitive (e.g., heat sensitive) substrates. The resulting coatings according to present aspects, possess characteristics including high strength, low porosity and minimal residual stress.

As mentioned above, characteristics of the thermoplastic coatings contemplated according to present aspects can be altered in a predetermined fashion by providing a predetermined combination of materials to form a tailored thermoplastic polymer powder feedstock material, and by further incorporating additives, including, without limitation, additives such as pigments, dyes, or coloring agents, etc. Such coloring agents can facilitate the inspection of the condition of coatings during, for example, inspections, etc.

As mentioned previously, the sprayers used in the systems and methods disclosed herein can be operated manually, but can also be automated by incorporating or otherwise attaching the sprayer to a robot, or robotic arm that includes or is in communication with sensors, controllers, software and hardware, etc. for the purpose of controlling the operation and movement of the sprayer and the operation of the sprayer during, for example a material deposition (e.g., coating, etc.) cycle. The robot and equipment associated with the robot and sprayer can be operated and powered directly, and further can be operated remotely in response to, for example, wireless signals, etc.

Where coating characteristics have included robustness in terms of adhesion and/or resistance to environmental factors such as those encountered, for example, in vehicle fuel tanks, etc., coating materials have been classified with various toxicities, making their handling and application hazardous to personnel. In addition, various application sites have been difficult to access. In addition, maintaining and/or replacing the coatings presently in use has resulted in significant repair and replacement time, as the removal of cured coatings. The coatings made possible according to aspects of the present disclosure, being thermoplastic materials, have significantly reduced toxicity during application, and can be more easily removed and replaced (e.g., at scheduled routine inspection and/or replacement).

In addition, the presently disclosed coatings made from the disclosed thermoplastic polymer powder formulations maintain adhesion characteristics over a required service period that is at least equivalent to or exceeds that, which is achievable using the previously available coatings and sealants (e.g., epoxy and acrylamide based options, etc.). The adhesion of the thermoplastic polymer coating made from the disclosed thermoplastic polymer powder formulations have an adhesion ranging from about 5 to about 50 lbs./in$^2$ wide area when performing adhesion testing set forth in ASTM D6862-11(2016) Standard Test Method for 90° Peel Resistance.

When a conductive film or coating is desired, the contemplated thermoplastic polymer coatings, sealants, films, etc. can be tailored to achieve a desired surface resistivity, for example, ranging from about $1\times10^5$ to $1\times10^{11}$ ohm-m when the conductive component composition of the thermoplastic polymer powder feedstock ranges from about 1% to about 9% by volume of the conductive thermoplastic polymer powder feedstock. The desired characteristics of the coating produced, including, for example, the desired resistivity, setting time, thickness, etc., determines the concentration of the conductive powder feedstock component that is incorporated into the thermoplastic polymer powder feedstock, or that is supplied to the sprayer substantially concurrently with the thermoplastic polymer powder feedstock (e.g., in the situation where feedstocks are supplied to the sprayer separately and a feedstock mixture is not prepared and then delivered to the sprayer).

Coatings and sealants typically applied to spatially restrictive and other difficult-to-access areas in various assemblies and sub-assemblies found, for example, in vehicles including aircraft have required coatings and sealants (e.g., epoxies and acrylamides, etc.) that require significant curing times in excess of many days. Components for use in such assemblies and sub-assemblies comprising the presently disclosed coatings find particular utility in the manufacture of vehicles, including aircraft, as well as structural components used in the manufacture of fuel tanks on such vehicles.

Further, long curing times delay manufacturing and increase manufacturing cost. In contrast to epoxy-based and other materials requiring curing time of several days or longer, the presently disclosed thermoplastic polymer coatings and sealants applied according to the presently disclosed methods do not require curing, and only require the time necessary for the thermoplastic material to cool and "set" (e.g. thermoplastic material "set" times understood to range from about less than a few mins. to about several mins., or the amount of time a thermoplastic material takes to cool from an applied temperature to about room (ambient) temperature, assuming coating thicknesses ranging from about 2.5 mm to about 5.0 mm). According to present aspects, such "set" times for the deposited thermoplastic polymer coatings and sealants disclosed herein (including the deposited conductive thermoplastic polymer coatings and sealants) are in strong contrast to the curing times of several hours or even several days that are required to cure sealants and coatings previously used for the purposes intended herein on the substrates and substrate surfaces intended and disclosed herein.

While many of the characteristics of thermoplastic polymers may have been desirable for use in coatings and sealants in hard to access locations in assemblies and sub-assemblies, use of such thermoplastic polymeric coatings had been particularly hampered where the coatings or sealants required conductivity (or needed to have certain resistivities), or where it had not been previously possible to deposit a thermoplastic coating having variable or tailored characteristics. According to aspects of the present disclosure, the fabrication and use of electrically conductive coatings and sealants that have multiple physical and chemical characteristics tailored that are made from presently disclosed thermoplastic polymer powder formulations, and applied according to presently disclosed methods has now been achieved.

FIG. 1 shows a block diagram outlining an aspect showing a thermoplastic polymer powder feedstock and a system 10 including directing the thermoplastic polymer powder feedstock to a high-velocity sprayer for depositing a thermoplastic polymer coating onto a substrate surface. As shown in FIG. 1, a thermoplastic polymer powder feedstock 12 is directed from a thermoplastic polymer powder feedstock supply via a thermoplastic polymer powder feedstock feedline 11 in communication with the thermoplastic polymer powder feedstock 12 and also in communication with a high-velocity sprayer 14. Predetermined amounts of the thermoplastic polymer powder feedstock 12 can be directed by any desirable means that will direct the thermoplastic polymer powder feedstock 12 to the high-velocity sprayer 14, including automated means regulated by a controller (not shown) and subject to, for example, software and hardware known to control, for example, feedstock flow rates, etc. The high-velocity sprayer can be a thermal sprayer or a cold sprayer. As shown in FIG. 1, the thermoplastic polymer powder feedstock 12 is converted by the high-velocity sprayer 14 into a thermoplastic polymer coating 16a onto substrate 16. While the high-velocity sprayer 14 can be operated manually, FIG. 1 shows an optional robotic arm 13 (or "robot") that can be in communication with a controller 15. Controller 15 can further optionally be in communication with remote or integrated software or hardware, as desired, to control robotic arm movement as well as control flow rates and amounts of material deposited as a thermoplastic coating 16a onto a substrate 16. Optionally, additional controllers (not shown) can be integrated into system 10 to control one or more aspects of system 10.

FIG. 2A shows a block diagram outlining an aspect showing a thermoplastic polymer powder feedstock mixture and system 20 including mixing multiple thermoplastic polymer powder feedstocks to form a thermoplastic powder mixture, and then directing an amount of the thermoplastic powder mixture to a high-velocity sprayer and depositing a thermoplastic polymer coating onto a substrate surface. As shown in FIG. 2A, in system 20, predetermined amounts of a first thermoplastic polymer feedstock 22a, and a second thermoplastic polymer feedstock 22b are directed to a mixing vessel (not shown). The predetermined amounts of the first and second thermoplastic polymer feedstocks 22a, 22b are delivered via first and second thermoplastic polymer powder feedstock feedlines 21a and 21b, respectively, and mixed together to form a thermoplastic polymer powder feedstock mixture 27. The thermoplastic polymer powder feedstock mixture 27 is directed via feedstock mixture feedline 28 to high-velocity sprayer 24. Feedstock mixture Feedline 28, as shown in FIG. 2A, is in communication with thermoplastic polymer powder feedstock mixture 27 and the high-velocity sprayer 24. Predetermined amounts of the first thermoplastic powder feedstock 22a and the second thermoplastic polymer powder feedstock 22b can be directed from respective feedstock supplies (not shown) by any desirable means, including automated means regulated by a controller (not shown) and subject to, for example, software and hardware known to control, for example, feedstock flow rates from a supply to a sprayer, etc. The high-velocity sprayer 24 can be a thermal sprayer or a cold sprayer. As shown in FIG. 2A, the thermoplastic polymer powder feedstock mixture 27 is converted by the high-velocity sprayer 24 into a thermoplastic polymer coating 26a deposited onto substrate 26. While the high-velocity sprayer 24 can be operated manually, FIG. 2A shows an optional robotic arm 23 (or "robot") that can be in communication with a controller 25. Controller 25 can further optionally be in communication with remote or integrated software or hardware, as desired, to control robotic arm movement as well as control flow rates and amounts of material deposited as a thermoplastic polymer coating 26a onto a substrate 26. Optionally, additional controllers (not shown) can be integrated into system 20 to control one or more aspects of system 20.

FIG. 2B shows a block diagram outlining an aspect showing two thermoplastic polymer powder feedstocks and system 30 similar to system 20 shown in FIG. 2A, except that, as shown in FIG. 2B, system 30 comprises first and second thermoplastic polymer powder feedstock feedlines 31a and 31b in communication with the high-velocity sprayer 24 and the first and second thermoplastic polymer powder feedstocks 22a and 22b, respectively. That is, as shown in FIG. 2B, amounts of the first and second thermoplastic polymer powder feedstocks 22a, 22b are not mixed together to form a feedstock mixture. Instead, according to the aspect shown in FIG. 2B as system 30, a predetermined amount of the first thermoplastic polymer powder feedstock 22a is directed to high-velocity sprayer 24 via first thermoplastic polymer powder feedstock feedline 31a. Similarly, a predetermined amount of the second thermoplastic polymer powder feedstock 22b is directed to the high-velocity sprayer 24 via second thermoplastic polymer powder feedstock feedline 31b. While the high-velocity sprayer 24 can be operated manually, FIG. 2B shows an optional robotic arm 23 (or "robot") that can be in communication with a controller 25. Controller 25 can further optionally be in communication with remote or integrated software or hardware, as desired, to control robotic arm movement as well as control flow rates and amounts of material deposited as a thermoplastic polymer coating 26a onto a substrate 26. Optionally, additional controllers (not shown) can be integrated into system 30 to control one or more aspects of system 30.

FIG. 3A shows a block diagram outlining an aspect showing a thermoplastic polymer powder feedstock and a conductive powder feedstock and a system 40. As shown in FIG. 3A, in system 40, a thermoplastic polymer powder feedstock 42a, and a conductive powder feedstock 42b are directed to a mixing vessel (not shown). The predetermined amounts of the first and second thermoplastic polymer feedstocks 42a, 42b are delivered via first and second thermoplastic polymer powder feedstock feedlines 41a and 41b, respectively, and mixed together to form a conductive thermoplastic polymer powder feedstock mixture 47. An amount of the conductive thermoplastic polymer powder feedstock mixture 47 is directed via conductive thermoplastic polymer powder feedstock mixture feedline 48 to high-velocity sprayer 44. Feedline 48 as shown in FIG. 3A is in communication with conductive thermoplastic feedstock mixture 47 and the high-velocity sprayer 44. Predetermined amounts of conductive thermoplastic polymer feedstock mixture 47 can be directed to the high-velocity sprayer 44 by any desirable means, including automated means regulated by a controller (not shown) and subject to, for example, software and hardware known to control, for example, feedstock flow rates from a supply to a sprayer, etc. The high-velocity sprayer 44 can be a thermal sprayer or a cold sprayer. As shown in FIG. 3A, the conductive thermoplastic polymer powder feedstock is converted by the high-velocity sprayer 44 into a conductive thermoplastic polymer coating 46a deposited onto substrate 46. While the high-velocity sprayer 44 can be operated manually, FIG. 3A shows an optional robotic arm 43 (or "robot") that can be in communication with a controller 45. Controller 45 can further optionally be in communication with remote or integrated software or hardware, as desired, to control movement of the robotic arm 43 as well as control flow rates and amounts of deposited conductive thermoplastic polymer coating 46a onto a substrate 46. Optionally, additional controllers (not shown) can be integrated into system 40 to control one or more aspects of system 40.

FIG. 3B shows a block diagram outlining an aspect showing a conductive thermoplastic polymer powder and a system 50 similar to system 40 shown in FIG. 3A, except that as shown in FIG. 3B, system 50 comprises a thermoplastic polymer powder feedstock feedline 51a in communication with a thermoplastic polymer powder feedstock 42a and a high-velocity sprayer 44. Conductive powder feedstock feedline 51b is shown in communication with the conductive powder feedstock 42b and the high-velocity sprayer 44. That is, as shown in FIG. 3B, an amount of the thermoplastic polymer powder feedstock 42a is not mixed with an amount of the conductive powder feedstock 42b to form a conductive thermoplastic polymer feedstock mixture. Instead, according to an aspect shown in FIG. 3B as system 50, a predetermined amount of the thermoplastic polymer powder feedstock 42a is directed to high-velocity sprayer 44 via thermoplastic polymer powder feedstock feedline 51a. Similarly, a predetermined amount of the conductive powder feedstock 42b is directed to the high-velocity sprayer 24 via conductive powder feedstock feedline 51b. While the high-velocity sprayer 44 can be operated manually, FIG. 3B shows an optional robotic arm 43 (or "robot") that can be in communication with a controller 45. Controller 45 can further optionally be in communication with remote or integrated software or hardware, as desired, to control movement of the robotic arm 43 as well as control flow rates and amounts of deposited conductive thermoplastic polymer coating 46a onto a substrate 46. Optionally, additional controllers (not shown) can be integrated into system 50 to control one or more aspects of system 50.

FIG. 4A shows a block diagram outlining an aspect showing a conductive thermoplastic polymer powder feedstock and a system 60 including mixing first and second thermoplastic polymer powder feedstocks with a conductive powder feedstock to form a conductive thermoplastic powder feedstock mixture, and then directing an amount of the conductive thermoplastic powder feedstock mixture to a high-velocity sprayer and depositing a conductive thermoplastic polymer coating onto a substrate surface. As shown in FIG. 4A, in system 60, an amount of a first thermoplastic polymer powder feedstock 62a, an amount of a second thermoplastic polymer powder feedstock 62b, and an amount of a conductive powder feedstock 62c are directed to a mixing vessel (not shown) and are mixed together to form a conductive thermoplastic polymer powder feedstock mixture 67. A desired amount of the conductive thermoplastic polymer powder feedstock mixture 67 is directed via feedstock mixture feedline 68 to high-velocity sprayer 64. Feedstock mixture feedline 68, as shown in FIG. 4A, is in communication with conductive thermoplastic polymer powder feedstock mixture 67 and the high-velocity sprayer 64. Predetermined amounts of: 1) the first thermoplastic polymer powder feedstock 62a; 2) the second thermoplastic polymer powder feedstock 62b; and 3) the conductive powder feedstock 62c are directed to the conductive thermoplastic polymer powder feedstock mixture 67 via first thermoplastic polymer powder feedstock feedline 61a, second thermoplastic polymer powder feedstock feedline 61b and conductive polymer powder feedstock feedline 61c, respectively, by any desirable means. Predetermined amounts of conductive thermoplastic polymer feedstock mixture 67 are directed to the high-velocity sprayer 64 by any desirable means, including, for example, an automated means regulated by a controller (not shown) and subject to, for example, software and hardware known to control, for example, feedstock flow rates to a sprayer, etc. The high-velocity sprayer 64 can be a thermal sprayer or a cold sprayer. As shown in FIG. 4A, the conductive thermoplastic polymer powder feedstock mixture 67 is converted by the high-velocity sprayer 44 into a conductive thermoplastic polymer coating 66a deposited onto substrate 46. While the high-velocity sprayer 64 can be operated manually, FIG. 4A shows an optional robotic arm 63 (or "robot") that can be in communication with a controller 65. Controller 65 can further optionally be in communication with remote or integrated software or hardware, as desired, to control movement of the robotic arm 63 as well as control flow rates and amounts of deposited conductive thermoplastic polymer coating 66a onto a substrate 66. Optionally, additional controllers (not shown) can be integrated into system 60 to control one or more aspects of system 60.

FIG. 4B shows a block diagram outlining an aspect showing a conductive thermoplastic polymer powder and a system 70 similar to system 60 shown in FIG. 4A, except that as shown in FIG. 4B, system 70 comprises: 1) a first thermoplastic polymer powder feedstock feedline 71a in communication with the first thermoplastic polymer powder feedstock 62a and the high-velocity sprayer 64; 2) a second thermoplastic polymer powder feedstock feedline 71b in communication with the first thermoplastic polymer powder feedstock 62b and the high-velocity sprayer 64; and 3) a conductive powder feedstock feedline 71c in communication with the conductive powder feedstock 62c and the high-velocity sprayer 64. That is, as shown in FIG. 4B, an amount of the first thermoplastic polymer powder feedstock 62a, and an amount of the second thermoplastic polymer powder feedstock 62b are not mixed with an amount of the conductive powder feedstock to form a conductive thermoplastic polymer feedstock mixture. Instead, according to system 70 shown in FIG. 4B, a predetermined amount of the first thermoplastic polymer powder feedstock 62a is directed to high-velocity sprayer 64 via first thermoplastic polymer powder feedstock feedline 71a. Similarly, a predetermined amount of the second thermoplastic polymer powder feedstock 62b is directed to high-velocity sprayer 64 via second thermoplastic polymer powder feedstock feedline 71b. Further, a predetermined amount of the conductive powder feedstock 62c is directed to the high-velocity sprayer 64 via conductive powder feedstock feedline 71c. While the high-velocity sprayer 64 can be operated manually, FIG. 4B shows an optional robotic arm 63 that can be in communication with a controller 65. Controller 65 can further optionally be in communication with remote or integrated software or hardware, as desired, to control movement of a robotic arm 63 (or "robot") as well as control flow rates and amounts of deposited conductive thermoplastic polymer coating 66a onto a substrate 66. Optionally, additional controllers (not shown) can be integrated into system 70 to control one or more aspects of system 70.

The robotic arm disclosed above is equivalently referred to herein as a "robot", such that any feature of the robot (in addition to the "arm") can control the relative movement of the high-velocity sprayer, and/or the robot can control the direction of spray emitted from the high-velocity sprayer (e.g., the robot controls the direction and change the direction of spray from the high-velocity sprayer while the sprayer itself remains in a substantially stationary position, etc.).

FIG. 5 is an illustration of an aircraft 80 comprising assemblies and sub-assemblies and components that further comprise fasteners, with the fasteners having coatings according to aspects of the present disclosure, with the fasteners coated using systems and coated via methods according to aspects of the present disclosure. It is further understood that, the coatings described herein can be advantageously coated onto substrates occurring on components, assemblies and sub-assemblies incorporated in further types of manned and unmanned aircraft, terrestrial vehicles, sub-surface and surface marine (e.g., water borne) vehicles, manned and unmanned satellites, etc.

FIGS. 6, 7 and —8 are flowcharts outlining aspects of the present disclosure. FIG. 6 outlines a method 100 comprising directing 102 at least one thermoplastic polymer powder to a high-velocity sprayer, followed by forming 104 a thermoplastic polymer spray formulation at or near the high-velocity sprayer. The method outlined in FIG. 6 further comprises directing 106 the thermoplastic spray formulation from the high-velocity sprayer to a substrate having a substrate surface, and forming 108 a thermoplastic polymer coating on the substrate surface. The method outlined in FIG. 6 is understood to at least relate to the systems shown in FIGS. 1, 2A and 2B.

FIG. 7 outlines a method 100 comprising directing 102 an amount of at least one thermoplastic polymer powder to a high-velocity sprayer, followed by directing 103 an amount of conductive powder to the high-velocity sprayer concurrently with thermoplastic polymer powder and forming 104a a conductive thermoplastic polymer spray formulation at or near the high velocity sprayer. The method further comprises directing 106a the conductive thermoplastic polymer spray formulation from the sprayer to a substrate surface, and forming 108a a conductive thermoplastic coating on the substrate surface. The method outlined in FIG. 7 is understood to at least relate to the systems shown in FIGS. 3A, 3B, 4A and 4B.

FIG. 8 outlines a method 120 comprising directing 102a an amount of a first thermoplastic polymer powder and an amount of a second thermoplastic polymer powder and an amount of a conductive powder to a high-velocity sprayer, followed by forming 104a a conductive thermoplastic polymer spray formulation. The method further comprises directing 106a the conductive thermoplastic polymer formulation from the sprayer to a substrate surface, and forming 108a a conductive thermoplastic coating on the substrate surface. The method outlined in FIG. 8 is understood to at least relate to the systems shown in FIGS. 4A and 4B.

FIG. 9 shows a representative illustration of a thermal spray deposition system 130 according to aspects of the present disclosure. As shown in FIG. 9, a feedstock 132 comprising individual feedstock particles 133 are heated, such as by directing the feedstock particles 133 to a flame 134 in a thermal sprayer (e.g., a flame sprayer, not shown in FIG. 9) at a particular velocity and in a direction as indicated by large arrows. The feedstock particles 133 deform as they melt to a semi-solid or liquid state. The deformed particles 135 then impact a substrate surface 136. The deformed particles continue to impact the substrate surface 136. As the illustrated thermal spray deposition process continues, a deposited layer 138 forms on the substrate surface 136.

FIG. 10 is an illustration of a thermal spray process 140 that can include the use of a high-velocity flame sprayer or a high-velocity cold sprayer (collectively referred to in FIG. 10 as the "sprayer"). As shown in FIG. 10, and according to aspects of the present disclosure, a sprayer 142 is operated to emit and direct a thermoplastic polymer particulate spray 143 formed by processing thermoplastic polymer powder feedstock that is directed to the sprayer. The feedstock can be tailored and can be made into a conductive feedstock (that can also be tailored) by adding varying amounts of conductive powder feedstock to the thermoplastic polymer powder feedstock. The thermoplastic polymer particulate spray 143 is directed from the sprayer 142 to a fastener 144 installed into a substrate 146. At least one thermoplastic polymer powder feedstock acts as a feedstock supply (not shown) that is supplied to the sprayer 142. According to further aspects, the feedstock can also be a conductive thermoplastic polymer powder feedstock mixture, with the feedstock mixture comprising a conductive powder feedstock. According to further aspects, when the feedstock comprises multiple components, each component can alternatively be supplied individually and also substantially concurrently to the sprayer via discrete feedstock feedlines (not shown). If desired the predetermined amounts of multiple feedstock components can be delivered to the sprayer via one or more feedstock feedlines by a sequencer and/or controller driven by automatically or manually in conjunction with attendant software and hardware, including the use of a robot. In this way the fastener 144 is coated to a predetermined thickness as particles in the particulate spray impact the fastener 144, the substrate 146, and the fastener/substrate interface 147. As shown in FIG. 10, the fastener 144 can be made from a metal or non-metal and the substrate 146 can also be made from a metal or a non-metal.

According to aspects of the present disclosure, when at least one of a fastener and the substrate are made from a metal having a different electrical resistivity (or electrical conductivity), a thermoplastic polymer powder feedstock can be "doped" with a predetermined amount of conductive powder feedstock to form a conductive thermoplastic polymer powder feedstock. As the conductive thermoplastic powder feedstock proceeds into and through the high-velocity sprayer, the conductive thermoplastic polymer powder feedstock comprising conductive feedstock particles and thermoplastic polymer feedstock particles is subjected at the sprayer to heat and/or high velocity via gas jets to at least soften and deform the particles in the conductive thermoplastic polymer powder feedstock. The combined feedstock particles leave the sprayer as a conductive thermoplastic polymer particulate spray at a predetermined velocity and impact a desired target such as, for example, the fastener 144, substrate 146 and the fastener/substrate interface 147 as shown in FIG. 10. Upon impact on the selected target(s), the particulate spray forms a coating on the target(s), with the coating having a desired, predetermined, and tailorable resistivity value. Further, the resistivity value of the coating formed can be tailored or "tuned" to a particular resistivity value. If the coated materials are subjected to an electromagnetic effect (EME), such as, for example, from the electrical discharge of static electricity, or a from a lightning strike, the conductivity of the thermoplastic coating will at least ameliorate deleterious effects from the EME that would otherwise be encountered at or near the fastener or at or near the fastener/substrate interface (e.g., adjoined structures) due to dissimilar resistivity values of such adjoined and/or proximately positioned structures. The thermoplastic coatings made possible according to aspects of the present disclosure further obviate the need to stock and employ expensive alternatives including, for example, physically applied fastener caps that are expensive and time-consuming to install, maintain and replace.

FIG. 11 is an illustration of an assembly comprising two structures adjoined via fastening with fasteners. As shown in FIG. 11, an assembly 150 comprises a first substrate 152 adjoined to a second substrate 153. Fasteners 154 are shown fitted, for example, through aligned holes (not shown) in substrates 152, 153, such that, the fasteners, when secured, exert pressure sufficient to hold substrates 152, 153 together in an adjoined orientation. As further shown in FIG. 11, fasteners 154 have a fastener first end 154a contacting a surface (the "upper" surface) of substrate 152, and a fastener second end 154b contacting a surface (the "lower" surface) of substrate 153.

FIG. 12 is a cross-sectional side-view of a coated fastener in position fastening together two substrates. As shown in FIG. 12, a fastener assembly 160 comprises first and second substrates 162, 163 fastened together by fastener 164. As shown in FIG. 12, the fastener 164, along with portions of substrates 162, 163 including fastener/substrate interfaces 166a, 166b, 166c and 166d, are coated by thermoplastic polymer fastener coating 168. Though shown as individual points, the fastener/substrate interface is understood to represent a "perimeter", such as a substantially circular perimeter located at the fastener/substrate interface.

According to aspects of the present disclosure, the thermoplastic polymer coating can be conductive having a desired and/or predetermined and tailorable (e.g., "tunable") resistivity. According to further aspects, the substrates 162, 163 can be made from a metal or non-metal material. Fastener 164 can be made from metal or non-metal material. Each of substrates 162, 163 and/or fastener 164 can be made from the same or different metals or the same or different non-metals. If the resistivity value of substrates 162, 163 differ from each other and/or differ from the resistivity value of the fastener 164, the fastening assembly area or region can be susceptible to deleterious effects when confronted with an EME event (e.g., such as from static discharge or a lightning strike, etc.).

According to present aspects, the resistivity value of the conductive thermoplastic polymer coating 168 formed to cover the fastener 164 can be tailored or "tuned" to any resistivity value as desired, and preferably ranging from about $1\times10^5$ to about $1\times10^{11}$ ohm-m, and more preferably ranging from about $1\times10^5$ to about $1\times10^8$ ohm-m. If the coated materials are subjected to an electromagnetic effect (EME), such as, for example, from the electrical discharge of static electricity, or a from a lightning strike, the conductivity of the thermoplastic coating will at least ameliorate deleterious effects from the EME that would otherwise be encountered at or near the fastener or at or near the fastener/substrate interface (e.g., adjoined structures) due to dissimilar resistivity values of such adjoined and/or proximately positioned structures.

FIG. 13 is an overhead perspective view, or "top" view of a coated fastener according to aspects of the present disclosure. As shown in FIG. 13, an area of an assembly 170 comprises a fastener 172 installed in a substrate 174. A thermoplastic polymer coating 176 is shown coating a portion of substrate 174 and fastener 172 to form a coated fastener 178. As with the fastener 164 shown in FIG. 12, when the thermoplastic polymer coating comprises a conductive material to form a conductive thermoplastic polymer coating on the fastener and at least a portion of the substrate. According to present aspects, the resistivity value of the conductive thermoplastic polymer coating formed to cover the fastener can be tailored or "tuned" to a predetermined resistivity value such that, if the coated materials are subjected to an electromagnetic effect (EME), such as, for example, from the electrical discharge of static electricity, or a from a lightning strike, the conductivity of the thermoplastic coating will at least ameliorate deleterious effects from the EME that would otherwise be encountered at or near the fastener or at or near the fastener/substrate interface (e.g., adjoined structures) due to dissimilar resistivity values of such adjoined and/or proximately positioned structures.

FIG. 14 is a flowchart outlining methods according to aspects of the present disclosure. As shown in FIG. 14, according to presently disclosed aspects, a method 200 for coating an installed fastener includes delivering 202 a thermoplastic polymer powder feedstock to a high-velocity sprayer. The high-velocity sprayer is preferably a high-velocity sprayer that can be a thermal sprayer (e.g. flame sprayer) or a cold sprayer. Further contemplated steps of method 200, include forming 204 a thermoplastic polymer coating material followed by directing 206 the thermoplastic polymer coating material from the high-velocity sprayer to a fastener and fastener/substrate interface on substrate surface, and depositing 208 an amount of the thermoplastic polymer coating material on the fastener to form a thermoplastic polymer coating on the fastener and at the fastener/substrate interface, and coating 210 the fastener with the thermoplastic polymer coating. The methods outlined in FIG. 14 can be used to accomplish the coating methods to prepare the coated fasteners, fastener/substrate interfaces and substrates shown and/or described in one or more of FIG. 1 through FIG. 13.

When a fastener, including a metal fastener is installed into an assembly that, for example, includes fastened first and second parts or substrates, and at least one substrate is made from a metal, according to the present disclosure, the thermoplastic coating material is conductive, and in certain aspects the conductive coating has a resistivity ranging from about $10^5$ to $18^1$ ohm-m. FIG. 15 is a flowchart outlining methods according to aspects of the present disclosure. As shown in FIG. 15, according to presently disclosed aspects, a method 300 for coating an installed fastener includes delivering 302 a conductive thermoplastic polymer to a high-velocity sprayer. The high-velocity sprayer is preferably a high-velocity sprayer that can be a thermal sprayer (e.g. flame sprayer) or a cold sprayer. Further contemplated steps of method 300, include forming 304 a conductive thermoplastic polymer coating material followed by directing 306 the conductive thermoplastic polymer coating material from the sprayer to a fastener and fastener/substrate interface on substrate surface, and depositing 308 an amount of the conductive thermoplastic polymer coating material on the fastener to form a conductive thermoplastic polymer coating on the fastener and at the fastener/substrate interface, and coating 310 the fastener with the conductive thermoplastic polymer coating. The methods outlined in FIG. 15 can be used to accomplish the coating methods to prepare the coated fasteners, fastener/substrate interfaces and substrates shown and/or described in one or more of FIG. 1 through FIG. 14.

Example 1

At room temperature, an amount of 95 g of PEEK powder (KetaSpire® KT820, low melt flow; KetaSpire® KT-880, high melt flow—Spire Ultra Polymers, Solvay, Brussels Belgium) having a median particle size of about 30 µm was mixed with an amount of 5 g of conductive titanium powder (TS1374—Titanium Powder—Stanford Advanced Materials, Irvine, Calif.) having a nominal particle diameter of about 90 µm. The two powders were mixed using a Mazerustar Mixer (Medisca, LasVegas, Nev.), to form a thorough conductive thermoplastic polymer powder mixture produced by the combining of the two powders (representing 100% by weight). The mixture was loaded as a feedstock into a reservoir of a thermal sprayer (ASC PG-550 (Alamo Supply Co., Lt., Houston, Tex.) Three formulations having a varied amount (% by volume) of titanium in the total powder mixture were prepared: 1) 1% titanium powder by volume; 2) 6% titanium by volume; and 3) 9% titanium by volume.

Example 2

The thermal sprayer was set to a flow rate equal to approximately 1 to 50 g/sec., and amounts of the three feedstock mixtures (conductive thermoplastic polymer powder mixtures) prepared in Example 1 were each directed from the reservoir into the thermal sprayer and to the heated spray head. Each feedstock achieved a phase change, from solid to a flowing, heated sprayable liquid, and was then sprayed as a particulate spray and directed by and from the thermal sprayer to a substrate surface comprising a lap joint interface of an aluminum panel (2000, 6000 and 7000 series aluminum) located proximate to a carbon fiber reinforced plastic composite panel. The substrate surface was solvent cleaned (acetone wipe) and dried completely. The head of the thermal sprayer was located at a distance of about 24" from the substrate surface. The thermal sprayer was moved manually to deposit a visually uniform coverage of the substrate surface. The substrate surface temperature was monitored with a thermostat.

Example 3

The conductive thermoplastic coatings prepared and deposited according to the processes described in Examples 1 and 2 were allowed to cool on the substrate surface for not more than 5 minutes. The conductive thermoplastic coating had measured resistivity values as set forth in Table 1 for three Samples (#1, #2, and #3) having 1%, 6% and 9% by volume of titanium in the conductive thermoplastic polymer powder formulations prepared. Adjusting the amount/concentration/ratio of conductive titanium powder in the thermoplastic polymer (PEEK/Ti) powder feedstock mixture resulted in a measured variance in the resistivity of the conductive thermoplastic polymer coating as noted in Table 1.

TABLE 1

PEEK/Titanium Powder

| PEEK Powder (% by total volume of PEEK/Ti Mixture) | Ti Powder (% by total volume of PEEK/Ti Mixture) | Resistivity (ohm-m) |
| --- | --- | --- |
| 99% | 1% | $1 \times 10e^{10}$ |
| 94% | 6% | $1 \times 10e^{8}$ |
| 91% | 9% | $1 \times 10e^{7}$ |

Additional amounts of thermoplastic polymer powders were mixed with varying amounts of conductive powders to produce feedstock mixtures the thermal spraying conducted as described above.

Further aspects of the present disclosure contemplate thermoplastic polymer fastener coatings and conductive thermoplastic polymer fastener coatings (and methods of their delivery to substrates and substrate surfaces comprising fasteners) and other components including components, assemblies, etc. for in structures and objects, including, for example, vehicles. Such contemplated components, assemblies etc. include, without limitation, fasteners for installing, securing, etc. components, assemblies, etc. associated with aircraft (e.g. spars, ribs, stringers, etc.), with such components finding particular utility in connection with vehicle fuel tanks and fuel tank systems. Such vehicles include, without limitation, a manned aircraft, an unmanned aircraft, a manned spacecraft, an unmanned spacecraft, a manned rotorcraft, an unmanned rotorcraft, a satellite, a rocket, a manned terrestrial vehicle, an unmanned terrestrial vehicle, a manned surface water borne vehicle, an unmanned surface water borne vehicle, a manned sub-surface water borne vehicle, an unmanned sub-surface water borne vehicle, and combinations thereof.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An assembly comprising:
    a first substrate, said first substrate comprising a first substrate surface;
    a second substrate, said second substrate comprising a second substrate surface;
    an installed fastener positioned at a fastener/substrate interface, said installed fastener configured to join the first substrate and the second substrate to form a fastener/substrate interface perimeter, said fastener/substrate interface perimeter occurring at at least one of the first substrate surface and the second substrate surface; and
    a tunable electrically dissipative spray-deposited thermoplastic polymer coating material requiring no curing, said tunable electrically dissipative spray-deposited thermoplastic polymer coating material configured to directly contact and coat the installed fastener and further configured to directly contact and coat the fastener/substrate interface perimeter to form an electrically dissipative restricted access coated fastener and an electrically dissipative restricted access coated fastener/substrate interface perimeter, said tunable electrically dissipative spray-deposited thermoplastic polymer coating material consisting of:
        a thermoplastic polymer consisting of at least one of nylon, polyetheretherketone, polyetherketoneketone, polyamide, polyphenylsulfide, polyphenylsulfone, polysulfone, and polyetherimide;
        an amount of conductive material said conductive material comprising an average particle size ranging from about 5 μm to about 80 μm;
    wherein the relative percentage by volume of conductive material present in the tunable electrically dissipative spray-deposited thermoplastic polymer coating material ranges from about 1% to about 9% by volume;
    wherein the tunable electrically dissipative spray-deposited thermoplastic polymer coating material density ranges from about 1.0 to about 1.8 g/cc;
    wherein the tunable electrically dissipative spray-deposited thermoplastic polymer coating material has a resistivity value ranging from about $1 \times 10^5$ to about $1 \times 10^{11}$ ohm-m; and
    wherein the tuned electrically dissipative spray-deposited thermoplastic polymer coating material has an adhesion ranging from about 5 to about 50 lbs./in wide area as determined by ASTM D6862-11(2016) Standard Test Method for 90° Peel Resistance.

2. The assembly of claim 1 wherein the conductive material comprises at least one of titanium, nickel alloy, copper, carbon black, graphene powder, and carbon nanotubes.

3. An object comprising the assembly of claim 1.

4. The assembly of claim 1, wherein the tunable electrically dissipative spray-deposited thermoplastic coating material has a resistivity value ranging from about $1 \times 10^5$ to about $1 \times 10^8$ ohm-m.

5. An object comprising the assembly of claim 2.

6. The object of claim 3, wherein the object is a vehicle selected from the group consisting of: a manned aircraft, an unmanned aircraft, a manned spacecraft, an unmanned spacecraft, a manned rotorcraft, an unmanned rotorcraft, a manned terrestrial vehicle, a unmanned terrestrial vehicle, a manned hovercraft, an unmanned hovercraft, a manned surface water borne vehicle, an unmanned surface water borne vehicle, a manned sub-surface water borne vehicle, and an unmanned sub-surface water borne vehicle.

7. The object of claim 5, wherein the object is a vehicle, said vehicle selected from the group consisting of: a manned aircraft, an unmanned aircraft, a manned spacecraft, an unmanned spacecraft, a manned rotorcraft, an unmanned rotorcraft, a manned terrestrial vehicle, a unmanned terrestrial vehicle, a unmanned terrestrial vehicle, a manned surface water borne vehicle, an unmanned surface water borne vehicle a manned sub-surface water borne vehicle, and an unmanned sub-surface water borne vehicle.

8. The assembly of claim 1, wherein the tunable electrically dissipative spray-deposited thermoplastic polymer coating material comprises:
   a first thermoplastic polymer material comprising at least one of nylon, polyetheretherketone, polyetherketoneketone, polyamide, polyphenylsulfide, polyphenylsulfone, polysulfone, and polyetheramide; and
   a second thermoplastic polymer material comprising at least one of nylon, polyetheretherketone, polyetherketoneketone, polyamide, polyphenylsulfide, polyphenylsulfone, polysulfone, and polyetheramide; and
   wherein the first thermoplastic polymer material is different from the second thermoplastic polymer material.

9. The assembly of claim 1, wherein the tunable electrically dissipative spray-deposited thermoplastic polymer coating material further comprises a thermoplastic fluoroelastomer.

10. An electrically dissipative high-velocity spray-deposited thermoplastic fastener coating for coating a fastener and a fastener/substrate interface perimeter, said electrically dissipative high-velocity spray-deposited thermoplastic fastener coating consisting of:
   a thermoplastic polymer consisting of at least one of: nylon, polyetheretherketone, polyetherketoneketone, polyamide, polyphenylsulfide, polyphenylsulfone, polysulfone, and polyetheramide;
   an amount of conductive material said conductive material comprising an average particle size ranging from about 5 µm to about 80 µm;
   wherein the thermoplastic polymer is combined with the amount of conductive material to form a tunable electrically dissipative spay-deposited thermoplastic polymer fastener coating material, said electrically dissipative spay-deposited thermoplastic polymer fastener coating material configured to coat an installed fastener and a fastener/substrate interface perimeter, said tunable electrically dissipative spay-deposited thermoplastic polymer fastener coating material requiring no curing;
   wherein the relative percentage by volume of conductive material present in the tunable electrically dissipative spray-deposited thermoplastic polymer fastener coating material ranges from about 1% to about 9% by volume;
   wherein the tunable electrically dissipative spray-deposited thermoplastic polymer fastener coating material density ranges from about 1.0 to about 1.8 g/cc;
   wherein the tunable electrically dissipative spray-deposited thermoplastic polymer fastener coating material has a resistivity value ranging from about $1\times10^5$ to about $1\times10^{11}$ ohm-m;
   wherein the tuned electrically dissipative spray-deposited thermoplastic polymer coating material has an adhesion ranging from about 5 to about 50 lbs./in wide area as determined by ASTM D6862-11(2016) Standard Test Method for 90° Peel Resistance; and
   wherein the tunable electrically dissipative spray-deposited thermoplastic polymer coating material is configured to directly contact and coat an installed fastener and further is configured to directly contact and coat the fastener/substrate interface a fastener/substrate interface perimeter to form an electrically dissipative restricted access coated fastener.

11. The electrically dissipative high-velocity spray-deposited thermoplastic fastener coating of claim 10, wherein the conductive material comprises at least one of titanium, nickel alloy, copper, carbon black, graphene powder, and carbon nanotubes.

12. The electrically dissipative high-velocity spray-deposited thermoplastic fastener coating of claim 10, wherein the tunable electrically dissipative thermoplastic polymer fastener coating material has a resistivity value ranging from about $1\times10^5$ to about $1\times10^8$ ohm-m.

13. A fastener/substrate interface perimeter comprising the electrically dissipative high-velocity spray-deposited thermoplastic polymer fastener coating of claim 10.

14. A fastener/substrate interface perimeter comprising the electrically dissipative high-velocity spray-deposited thermoplastic fastener coating of claim 11.

15. The electrically dissipative spray-deposited thermoplastic fastener coating of claim 10, wherein the tunable electrically dissipative spray-deposited thermoplastic polymer coating material comprises:
   a first thermoplastic polymer material consisting of at least one of nylon, polyetheretherketone, polyetherketoneketone, polyamide, polyphenylsulfide, polyphenylsulfone, polysulfone, and polyetheramide;
   a second thermoplastic polymer material consisting of at least one of nylon, polyetheretherketone, polyetherketoneketone, polyamide, polyphenylsulfide, polyphenylsulfone, polysulfone, and polyetherimide;
   and
   wherein the first thermoplastic polymer material is different from the second thermoplastic polymer material.

16. The electrically dissipative spray-deposited thermoplastic fastener coating of claim 10, wherein the tunable electrically dissipative spray-deposited thermoplastic polymer coating material further comprises a thermoplastic fluoroelastomer.

17. A method for coating an installed fastener comprising:
   delivering a thermoplastic polymer powder feedstock to a high-velocity cold sprayer, said thermoplastic polymer powder consisting of at least one of
   nylon, polyetheretherketone, polyetherketoneketone, polyamide, polyphenylsulfide, polyphenylsulfone, polysulfone, and polyetheramide;
   delivering an amount of conductive material feedstock to a high-velocity cold sprayer, said conductive material feedstock comprising an average particle size ranging from about 5 µm to about 80 µm;
   forming a tunable electrically conductive thermoplastic polymer powder feedstock, said tunable electrically conductive thermoplastic polymer powder feedstock tunable in real time;
   forming a tunable electrically dissipative thermoplastic polymer coating material requiring no curing;
   depositing an amount of the tunable electrically dissipative thermoplastic coating material directly onto a substrate surface to directly contact and coat an installed fastener and a fastener/substrate interface perimeter;

directly coating the installed fastener and the fastener/substrate interface perimeter with the tunable electrically dissipative thermoplastic coating material;

adhering the tunable electrically dissipative thermoplastic coating material to at least one of the installed fastener and the fastener/substrate interface at an adhesion ranging from about 5 to about 50 lbs./in wide area as determined by ASTM D6862-11(2016) Standard Test Method for 90° Peel Resistance; and wherein the relative percentage by volume of conductive material present in the tunable electrically dissipative spray-deposited thermoplastic polymer coating material ranges from about 1% to about 9% by volume.

18. The method of claim 17, wherein, in the step of depositing an amount of the tunable electrically dissipative thermoplastic coating material from the high-velocity cold sprayer to directly coat at least one of the installed fastener and a fastener/substrate interface perimeter, the method further comprising;

directing the movement of the high-velocity cold sprayer by associating a robot structure in communication with the high-velocity cold sprayer, said robotic structure further in communication with a controller, the method further comprising:

controlling the amount of tunable electrically dissipative thermoplastic coating material applied to the installed fastener and the fastener/substrate interface perimeter.

19. A method for directly coating an installed fastener comprising:

delivering a tunable electrically dissipative thermoplastic polymer powder feedstock mixture to a high-velocity cold sprayer, said tunable electrically dissipative thermoplastic polymer powder feedstock mixture comprising:

a first thermoplastic polymer powder feedstock, said first thermoplastic polymer powder feedstock consisting of at least one of nylon, polyetheretherketone, polyetherketoneketone, polyamide, polyphenylsulfide, polyphenylsulfone, polysulfone, and polyetheramide;

a second thermoplastic polymer powder feedstock, said second thermoplastic polymer powder feedstock consisting of at least one of: nylon, polyetheretherketone, polyetherketoneketone, polyamide, polyphenylsulfide, polyphenylsulfone, polysulfone, and polyetherimide;

a conductive powder feedstock, said conductive powder feedstock comprising at least one of titanium, nickel alloy, copper, carbon black, graphene powder, and carbon nanotubes;

forming a tunable electrically dissipative thermoplastic polymer coating material requiring no curing;

directing the tunable electrically dissipative thermoplastic polymer coating material from the high-velocity cold sprayer to the installed fastener and the fastener/substrate interface perimeter;

spray-depositing an amount of the tunable electrically dissipative thermoplastic polymer coating material directly onto the installed fastener and the fastener/substrate interface perimeter;

directly contacting and coating the installed fastener and the fastener/substrate interface
perimeter with the tunable electrically dissipative thermoplastic polymer coating material;

adhering the tunable electrically dissipative thermoplastic polymer coating material to the fastener at an adhesion ranging from about 5 to about 50 lbs./in wide area as determined by ASTM D6862-11(2016) Standard Test Method for 90° Peel Resistance;

wherein the relative percentage by volume of conductive powder feedstock present in the tunable electrically dissipative thermoplastic polymer powder feedstock mixture ranges from about 1% to about 9% by volume; and wherein the first thermoplastic polymer powder feedstock is different from the second thermoplastic polymer powder feedstock.

20. The method of claim 19, the tunable electrically dissipative thermoplastic polymer coating material further comprising:

a resistivity value ranging from about $1 \times 10^5$ to about $10^8$ ohm-m.

21. The method of claim 19, wherein, in the step of directing the tunable electrically dissipative thermoplastic polymer coating material from the high-velocity cold sprayer to directly contact and coat the installed fastener and the fastener/substrate interface perimeter, the method further comprising;

directing the movement of the high-velocity cold sprayer by associating a robot in communication the high-velocity cold sprayer, said robot further in communication with a controller; and controlling the amount of tunable electrically dissipative thermoplastic coating material directly applied to the installed fastener and the fastener/substrate interface perimeter.

* * * * *